US010706155B1

(12) United States Patent
Veselov et al.

(10) Patent No.: US 10,706,155 B1
(45) Date of Patent: Jul. 7, 2020

(54) PROVISION AND EXECUTION OF CUSTOMIZED SECURITY ASSESSMENTS OF RESOURCES IN A COMPUTING ENVIRONMENT

(71) Applicant: Amazon Technologies, Inc., Seattle, WA (US)

(72) Inventors: Vladimir Veselov, Auburn, VA (US); Adrian-Radu Grajdeanu, Great Falls, VA (US); Hassan Sultan, Seattle, WA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 267 days.

(21) Appl. No.: 15/719,450

(22) Filed: Sep. 28, 2017

(51) Int. Cl.
*G06F 21/57* (2013.01)
*G06F 9/455* (2018.01)

(52) U.S. Cl.
CPC ........ *G06F 21/577* (2013.01); *G06F 9/45558* (2013.01); *G06F 2009/45587* (2013.01); *G06F 2009/45591* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,340,776 B2 * | 3/2008 | Zobel | .................... | G06F 21/577 713/188 |
| 7,716,742 B1 * | 5/2010 | Roesch | ................. | H04L 67/125 726/25 |
| 7,774,361 B1 * | 8/2010 | Nachenberg | .......... | G06F 21/552 707/779 |
| 8,150,717 B2 * | 4/2012 | Whitmore | ............ | G06Q 10/063 705/7.11 |
| 8,209,738 B2 * | 6/2012 | Nicol | .................... | H04L 41/142 726/1 |

(Continued)

FOREIGN PATENT DOCUMENTS

JP 201691104 4/2016

OTHER PUBLICATIONS

Hadfield et al. (Lee Hadfield, Dave Hater, Dave Bixler, "Windows NT Server 4 Security Handbook", 1997, ISBN: 078971213), p. 64-86.*

(Continued)

*Primary Examiner* — Piotr Poltorak
(74) *Attorney, Agent, or Firm* — Quarles & Brady LLP

(57) ABSTRACT

Systems for providing a security assessment of a target computing resource, such as a virtual machine or an instance of a virtual machine, include a security assessments provisioning service that provisions third-party-authored rules packages and security assessments into the computing environment of the target computing resource. The third-party rules package includes rules that can operate on telemetry and configuration data of the target computing resource, produced by sensors that are native to the computing environment, but the sensor protocols, message format, and sensitive data are not exposed to the rules. The provisioning service can provide security assessments and/or rules packages that are "native" and are thus able to operate directly on the telemetry and configuration data.

19 Claims, 18 Drawing Sheets

(56) References Cited

U.S. PATENT DOCUMENTS

| | | | |
|---|---|---|---|
| 8,341,745 B1* | 12/2012 | Chau | G06F 21/56 709/223 |
| 8,789,190 B2* | 7/2014 | Russell | H04L 63/1433 726/22 |
| 8,799,431 B2 | 8/2014 | Pabari | |
| 8,843,435 B1 | 9/2014 | Trefler et al. | |
| 8,850,512 B2 | 9/2014 | Price et al. | |
| 8,850,588 B2 | 9/2014 | Kumar et al. | |
| 8,959,568 B2* | 2/2015 | Hudis | G06F 21/552 726/1 |
| 9,116,733 B2 | 8/2015 | Banga et al. | |
| 9,223,972 B1* | 12/2015 | Vincent | G06F 21/566 |
| 9,438,618 B1* | 9/2016 | Sultan | H04L 63/1433 |
| 9,529,613 B2 | 12/2016 | Muller et al. | |
| 9,756,070 B1* | 9/2017 | Crowell | G06F 9/45533 |
| 10,021,115 B2* | 7/2018 | Bejarano Ardila | H04L 63/20 |
| 10,021,124 B2* | 7/2018 | Oliphant | G06F 21/57 |
| 10,148,693 B2* | 12/2018 | Singh | H04L 63/20 |
| 10,333,963 B2* | 6/2019 | Pope | G06F 21/577 |
| 2002/0161990 A1* | 10/2002 | Zhang | G06F 8/61 713/1 |
| 2003/0130921 A1 | 7/2003 | Force et al. | |
| 2003/0212909 A1* | 11/2003 | Chandrashekhar | G06F 21/577 726/25 |
| 2004/0024483 A1 | 2/2004 | Holcombe | |
| 2005/0102534 A1* | 5/2005 | Wong | G06F 21/577 726/4 |
| 2005/0246549 A1* | 11/2005 | Torrubia-Saez | H04K 1/00 713/182 |
| 2005/0273859 A1* | 12/2005 | Chess | G06F 21/577 726/25 |
| 2006/0085852 A1* | 4/2006 | Sima | G06F 21/552 726/22 |
| 2006/0200439 A1* | 9/2006 | Bhatia | G06F 16/86 |
| 2006/0265324 A1* | 11/2006 | Leclerc | G06F 21/577 705/38 |
| 2007/0067847 A1* | 3/2007 | Wiemer | G06F 21/577 726/25 |
| 2007/0143851 A1* | 6/2007 | Nicodemus | G06F 11/3495 726/25 |
| 2007/0180490 A1* | 8/2007 | Renzi | G06F 21/577 726/1 |
| 2008/0065705 A1* | 3/2008 | Miller | G05B 21/02 |
| 2009/0089879 A1* | 4/2009 | Wang | G06F 21/53 726/24 |
| 2010/0057550 A1* | 3/2010 | Nguyen | G06Q 30/02 705/14.25 |
| 2010/0175108 A1* | 7/2010 | Protas | G06F 21/53 726/3 |
| 2010/0199351 A1* | 8/2010 | Protas | G06F 21/577 726/25 |
| 2011/0145920 A1* | 6/2011 | Mahaffey | G06F 21/564 726/22 |
| 2011/0161680 A1 | 6/2011 | Grube et al. | |
| 2012/0290323 A1 | 11/2012 | Barsoum et al. | |
| 2012/0304300 A1* | 11/2012 | LaBumbard | G06F 21/577 726/25 |
| 2013/0055398 A1* | 2/2013 | Li | G06F 21/577 726/25 |
| 2013/0247206 A1* | 9/2013 | Hugard, IV | G06F 21/577 726/25 |
| 2013/0269029 A1* | 10/2013 | Nakawatase | H04L 63/16 726/22 |
| 2014/0173739 A1 | 6/2014 | Ahuja et al. | |
| 2014/0200686 A1* | 7/2014 | Madam | G05B 23/0229 700/52 |
| 2015/0269383 A1* | 9/2015 | Lang | G06F 21/57 726/1 |
| 2015/0381433 A1* | 12/2015 | Kimura | G06F 9/445 709/224 |
| 2016/0044035 A1* | 2/2016 | Huang | H04L 63/0272 726/4 |
| 2016/0078225 A1* | 3/2016 | Ray | G06F 21/554 726/23 |
| 2016/0088019 A1 | 3/2016 | Li et al. | |
| 2016/0099963 A1 | 4/2016 | Mahaffey et al. | |
| 2018/0005274 A1 | 1/2018 | Calvillo et al. | |
| 2018/0063181 A1* | 3/2018 | Jones | H04L 63/1433 |
| 2018/0091558 A1* | 3/2018 | Daugherty | G06F 21/577 |
| 2018/0121221 A1* | 5/2018 | Ahuja | G06F 9/45558 |
| 2018/0167402 A1* | 6/2018 | Scheidler | G06F 21/552 |
| 2018/0324204 A1* | 11/2018 | McClory | H04L 41/5041 |

OTHER PUBLICATIONS

NIST Special Publication 800-115, Technical Guide to Information Security Testing and Assessment Karen Scarfone, Murugiah Souppaya, Amanda Cody and Angela Orebaugh 80 pages, Sep. 2008.
NIST Special Publication 800-30, Guide for Conducting Risk Analysis 95 pages, Sep. 2012.
Tyson Brooks et al., Security Vulnerability Analysis in Virtualized Computing Environments, IJICR, vol. 3, Issue 4, pp. 263-277, Dec. 2012.
Enisa: Security Aspects of Virtualization European Union Agency for Network and Information Security ISBN 978-92-9204-211-0, DOI 10.2824/955316 97 pages, Feb. 2017.

* cited by examiner

PROVISION AND EXECUTION OF CUSTOMIZED SECURITY ASSESSMENTS OF RESOURCES IN A COMPUTING ENVIRONMENT

BACKGROUND

Generally described, computing devices utilize a communication network, or a series of communication networks, to exchange data. Companies and organizations operate computer networks that interconnect a number of computing devices to support operations or provide services to third parties. The computing systems may be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. The single physical computing device may create, maintain, delete, or otherwise manage virtual machines in a dynamic manner. In some scenarios, various computing devices may be associated with different combinations of operating systems or operating system configurations, virtualized hardware resources, and software applications to enable a computing device to provide different desired functionalities, or to provide similar functionalities more efficiently. Virtual machines may themselves be partitioned into multiple isolated virtual systems, called "containers." The virtual machine controls allocation of resources such as processing power and memory, and each container has its own process and network space in which the container may, for example, execute software programs.

In such a system, a service provider may operate networks of systems to provide access to software using varying numbers of virtual machine resources. The large numbers of customers, end users, virtual machine configurations, software packages, and hardware computing devices invite security issues to arise. The service provider may thus provide or enable security assessment services that analyze the behavior of computing resources to identify vulnerabilities, bad configurations, and the like.

BRIEF DESCRIPTION OF THE DRAWINGS

The detailed description is set forth with reference to the accompanying figures. The use of the same reference numbers in different figures indicates similar or identical items or features.

DETAILED DESCRIPTION

Figure 1A:
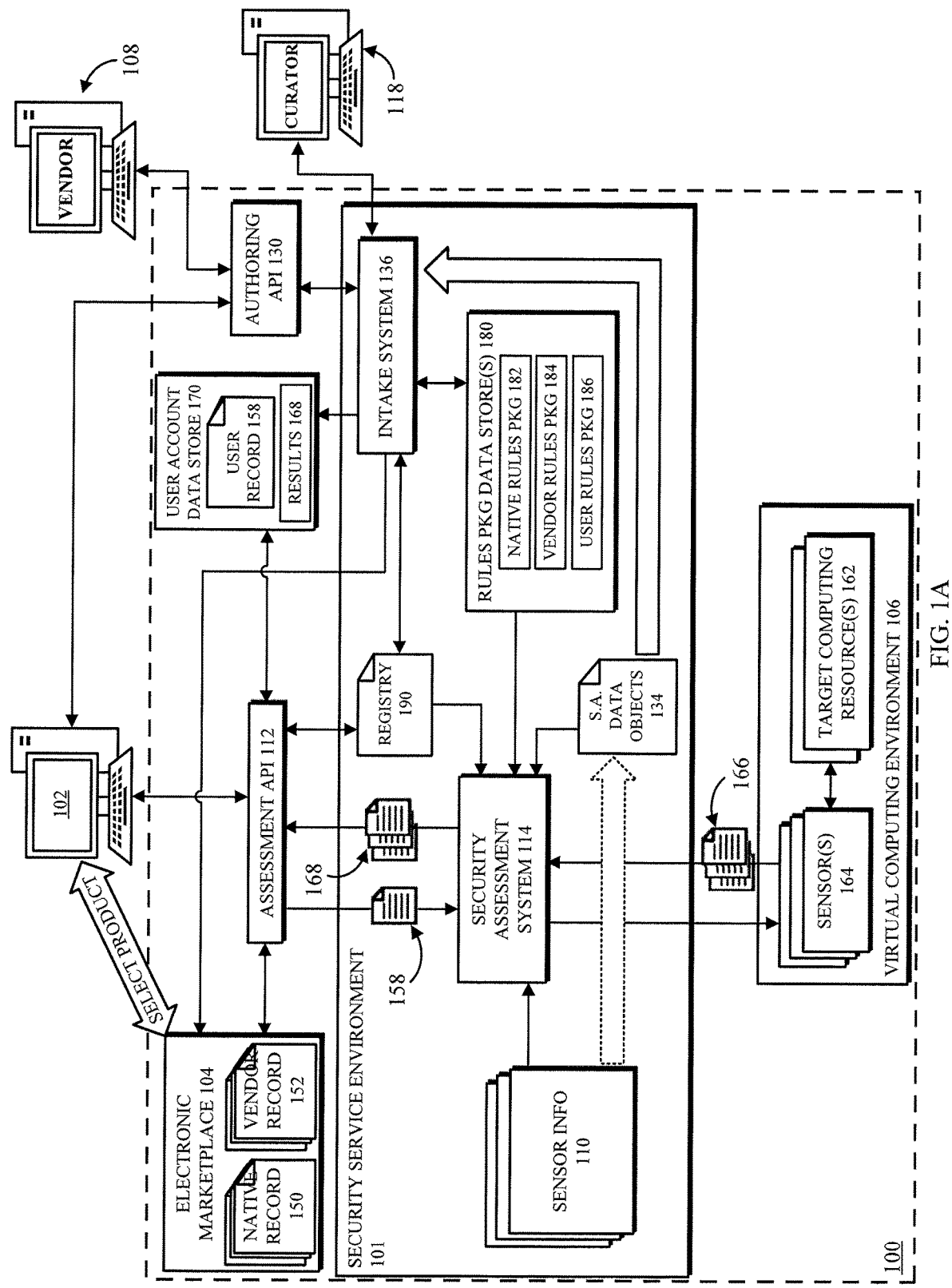
FIG. 1A is a diagram illustrating an example system for creating customized rules packages and security assessments and making them available to users for performing the security assessments on user virtual computing environments, in accordance with the present disclosure.

In various embodiments, including without limitation the example embodiments illustrated and described herein, the present disclosure provides systems and methods for performing security assessments of virtualized compute resources and the hardware computing devices that implement them. The presently described systems and methods are particularly suited for security assessments performed in a data center at any level of abstraction, non-limiting examples including: block-level storage devices, memory, hard disk drives, and other physical volumes; file systems; logical volumes and partitions; operating systems and virtual file systems, and data stored in such systems; application-specific frameworks; virtual machines and virtual environments implementing virtual machines. While the present disclosure contemplates implementation of any suitable security assessment, the examples below particularly describe systems and methods for implementing security assessments that are defined wholly or in part by one or more rules packages.

In particular, a security assessment of a virtual computing resource, as contemplated herein, identifies at least one rules package that is executed against collected data describing the virtual computing resource, and may further include parameters that configure the security assessment. The collected data represents the outcomes of monitoring actions performed on the virtual computing resource; for example, an action that determines the operating system of a virtual machine instance has, as its outcome, a data element identifying the operating system. A rules package is comprised of one or more rules that each, identifies the outcome(s) the rule evaluates, and contains comparative logic that compares the outcome(s) to one or more expected outcomes to produce an assessment result, also known as a "finding," which describes the state of an assessment target with respect to a vulnerability that the rule is testing for. A scanning service that performs the security assessment on a target resource ensures that the monitoring actions are performed in order to generate the data that the rules of the rules package evaluate. For example, the service may obtain configuration parameters of the target resource, or may monitor telemetry data representing usage of the target resource, or may send requests and/or commands to the target resource and record the response data. The collected and/or generated data is the "outcome" of the service's performance of the task associated with the rule. Some of the configuration parameters of the security assessment may configure this data collection, such as by identifying data-generating sensors to use or activating the sensors for a specified duration.

The service compares the outcome (i.e., the data) to the expected outcome(s) to determine a degree to which the target resource is exposed to or protected against the vulnerability tested by the rule. In one example, the rule may identify only one expected outcome, which is typically tied to a "clear" assessment result indicating there is no (or an acceptable level of) exposure; if the outcome matches the expected outcome, there is no (or negligible) security risk, and if not, the target resource and/or its data is vulnerable to the attack(s) that the task is testing for. In another example, the service can produce one of several different assessment results each tied to its own expected outcome within the rule; this allows different actions to be taken or recommended to a user based on multiple possible outcomes of the task's performance. Some rules packages require the service to evaluate all of the rules to complete the security assessment, while others allow a subset of the rules to be selected, and still others have branching or otherwise hierarchical internal structures by which some rules can be skipped based on the assessment results produced from other rules. The configuration parameters of the security assessment may cause the service to perform additional operations on the assessment results, such as by attaching prescribed data elements to certain findings, formatting the findings into a report, or designating a storage location for the assessment results.

Computing resource service providers and security software vendors produce rules packages that address the most prevalent security risks faced by their typical customers; such packages include Common Vulnerabilities and Exposures (CVEs), Center for Internet Security (CIS) benchmarks, "best practices" packages, static or runtime behavior analysis, host configuration assessments, and the like. A computing resource service provider has the advantage of controlling the content and structure of the rules in a "native" rules package, as well as the types, sources, and formatting of the data that can be collected or generated by a scanning service. Another advantage is the relative security of user data transfer when the target resource, user data, scanning service, and assessment result storage are all within the computing resource service provider's systems.

Nevertheless, a customer of the computing resource service provider may wish to use a security assessment and/or a rules package developed and maintained by a security software vendor (or another third party). For example, the vendor's security assessment or rules package may check for different vulnerabilities than those associated with the native rules packages, or the vendor's security assessment may have particular customizations that are relevant to the customer. Additionally, a customer, such as a corporate entity that has internal data security policies, may want to develop and use its own rules packages and/or security assessments that are specific to its needs. These customer-generated, third-party, or otherwise customized rules packages must be able to instruct the scanning service that evaluates the rules how to interface with the computing resource service provider's components, which may include physical and virtualized computing resources, communication networks, data collection endpoints (e.g., sensors), data formats, software programs, and the like. Correspondingly, the computing resource service provider and its various virtual computing environments must be made compatible with custom rules packages and with third party services that seek to securely extract from the system pre- and/or post-assessment data pertaining to the third party's rules packages.

The present systems and methods enable a computing resource service provider to interface with security assessments and/or security assessment rules packages authored by customers and/or third parties, so that the security assessments and rules packages can be provisioned to a customer, configured by the customer, and activated by the customer in order to assess the security of one or more computing resources allocated to the customer by the computing resource service provider.

A security assessment may involve sending requests and/or other information to one or more targets, such as a virtual machine, a group of interconnected virtual machines, a container of a virtual machine, a software application, a service, a server, a hard disk drive or logical volume, etc., and receiving user data describing how the one or more targets respond to the requests. In some embodiments, such sending, recording, querying, monitoring, and related actions can be performed by a security agent program installed in one or more of the targets. Each of these data collection/generation actions, and/or one or more groups of the actions, may have a corresponding identifier. The user data may include data structures that organize the data according to the action(s) that collected or generated it. The system executing the security assessment may include an ingestion service that receives the collected data and converts it into one or more data objects that a third-party/customer-authored rule can interact with to obtain the outcomes that the rule evaluates. This allows the security assessment system to, in some example embodiments, remove, mask, anonymize, reformat, and otherwise modify the raw collected data so that certain sensitive data, data formats, and/or data operations are not exposed to the provided rules package or its author. The computing resource service provider's interface with the third-party/ customer author may provide the author with a selection of data types or data retrieval actions, a description of the functionality of the corresponding actions, and a data format that the author uses to enable the author's rules to invoke the security agent program's actions.

The author may thus provide specifications, within the rules package, identifying which sensor results the rules package needs the security agent program to collect, as well as how sensor results will be evaluated and/or transformed during the security assessment. The present systems may provide an application programming interface (API) enabling the author to create such specifications and submit them for use in the computing resource service provider's systems (i.e., by its customers). The authoring API may further enable the author to create security assessments that use the rules package(s) the author provides, and that may also or alternatively use the "native" rules packages of the computing resource service provider. The authoring API may, for example, enable the author to provide security assessment configuration parameters, such as rules package(s) used, compatible virtual computing resource type(s), duration that data should be collected, format of assessment results and associated reports, access permissions and other security measures, and the like; the configuration parameters may constitute a default configuration for executing instances of the security assessment. The present systems may include a registry that maintains configuration parameters of security assessments and/or rules packages that have been provided to the computing resource service provider. Such a registry may include an identifier of the security assessment or rules package, a title, a description of the goals of the associated security assessment, a list of identifiers for the sensors or data collection actions the rules package invokes, a version indicator, and a visibility indicator. The visibility indicator can reflect the author's desired privacy of the security assessment or rules package; for example, a vendor may set its security assessments and rules packages to "public" so all users can see them, while a corporation may set to "private" (i.e., invisible to other users) any security assessments or rules packages that are customized for the corporation's own internal data and policies.

The present systems and methods may further include a provisioning service and an accompanying user interface that functions as an electronic marketplace where customers can browse and acquire security assessments that are available to it (e.g., are set to "public" in the registry). The provisioning service may include a user interface enabling the review, selection, and acquisition of a security assessment. For this service, the registry may further include commercialization parameters such as price and rating for each security assessment. The provisioning service may further include a deployment component that associates a newly acquired security assessment with the customer's account. The customer may then configure and activate the security assessment against its resources. Additionally or alternatively to making the security assessments available (i.e., selectable for purchase and/or provisioning) in the electronic marketplace, rules packages that are publicly visible may be made available in the electronic marketplace. Thus, as described herein, in one example a customer may access the electronic marketplace and select a first rules package, the system may provision the first rules package (e.g., by associating the first rules package with the customer's user account) for the customer to use on its virtual computing resources, and the customer may then be able (e.g., thru an API) to configure and activate one or more instances of a security assessment that uses the first rules package on a target computing resource. In another example, the customer may access the electronic marketplace and select a first security assessment that uses a first rules package, the system may provision the first security assessment (e.g., by associating security assessment data, such as a default configuration, and the first rules package with the customer's user account) for the customer to use on its virtual computing resources, and the customer may then be able (e.g., thru an API) to configure and activate one or more instances of the first security assessment on a target computing resource.

Once activated, the security assessment can be performed by a scanning service. In one embodiment, the scanning service and the security assessment rules package may be instantiated on virtual computing resources, such as a virtual machine instance, that are in the same virtual computing environment as the target(s) of the security assessment. In another embodiment, the security assessment rules package may be instantiated on virtual computing resources in a virtual computing environment of the author of the rules package; the rules package may be executable (i.e., the tasks may be performed) within the author's virtual computing environment, and the execution may be performed or initiated by the scanning service, which operates within or outside of the same virtual computing environment. In another embodiment, the scanning service may be a persistent service operating in the computing resource service provider's system, outside of any customer's virtual computing environment. In some embodiments, the scanning service may install the security agent program in the target resources and/or configure the security agent program to collect and/or generate the data (including telemetry data, configuration data, etc.) required by the rules package. The scanning service can obtain the collected data (e.g., via secure channel with the security agent program) and perform the evaluation prescribed by the rules in the rules package, producing assessment results and storing the assessment results in a limited-access storage location.

In some embodiments, the assessment results can be made available to the third-party author of the rules package unaltered, and in other embodiments the assessment results can be anonymized and/or encrypted to protect sensitive user information. The scanning service may grant or verify authorization for a retrieval service of the third party to access the limited-access storage location and retrieve the assessment results. Alternatively, the scanning service may deliver the assessment results to the retrieval service. In another embodiment, the scanning service may be a third-party scanning service operating outside of the computing resource service provider's system. A data preparation service or a software program within the computing resource service provider's systems may anonymize and/or encrypt the user data and either send the user data to the scanning service or enable the scanning service to retrieve the user data from a limited-access storage location.

Referring to FIG. 1A, embodiments of the present disclosure may operate within or upon a computing environment 100 in which users, e.g., developers, customers, administrators, and other "users" that may hold a "user account" with a computing resource service provider, may use user devices 102 to request and manage allocation of physical resources of computing devices (e.g., server computers 142) in order to run software programs, provide or access services, store and process data, communicate with other computers and users, and the like. The physical resources may be allocated as virtual computing resources (e.g., virtual machines). In some embodiments, the virtual resources may be allocated within a virtual computing environment 106 associated with the user (e.g., a virtual network). In some embodiments, the computing environment 100 may provide, or otherwise be compatible with, one or more application programming interfaces (APIs) through which a user device 102 can connect to one or more services, data stores, virtual computing environments, and other components of the computing environment 100. For example, an API may be a web-based interface implemented on a web server within the computing environment 100 as described further below. In some embodiments, instead of or in addition to the API, a web console interface may be transmitted to the user device 102 and displayed thereon. In either case, an interface can be made available that enables the user of the user device 102 to provide settings, commands, software packages, and other user input, into the computing environment 100. Such user input may be used to configure virtual computing environments of the computing environment 100, such as the virtual computing environment 106 associated with the user or the user's account; the user may be required to provide credentials and be authenticated and authorized to modify its virtual computing environments and virtual resource allocations (e.g., via an API).

The computing environment may include a security service environment 101, which may be a virtual computing environment associated with and accessible by one, some, or all users of the computing resource service provider. The security service environment 101 may be implemented in the data processing architecture of the computing resource service provider's computing environment 100. For example, the security service environment 101 may be part of a control plane that provisions virtual computing environments of the users. Furthermore, the computing resource service provider may implement multiple computing environments 100, such as in disparate geographic locations; the security service environment 101 may span the multiple computing environments, or each individual computing environment 100 may include its own security service environment 101. In some embodiments, the security service environment 101 may include one or more components, such as services, programs, data stores, network connections, and the like, which cooperate to perform security assessments as described herein. A component service, implemented in software or hardware, may perform the various discrete tasks described herein, or in some embodiments may cause them to be performed by other services. For example, in some embodiments a security assessment system 114 may itself perform security assessments of identified data, while in other embodiments the security assessment system 114 may send requests to another service, external to the security assessment system 114, to perform the assessment. Other embodiments of a computing environment 100 may not have a security service environment 101 dedicated to performing security assessments; instead, components such as the security assessment system 114 and intake system 136 may be implemented directly within the data processing architecture of the computing environment 100.

The physical hardware implementing any of the physical, logical, and/or virtual computing resources, the computing environment 100, and/or the virtual computing environment(s) 101, 106, may include one or more server computers. A server computer (e.g., server computer(s) 142 implementing the security service environment 101 and/or the user's virtual computing environment 106) may be any device or equipment configured to execute instructions for performing data computation, manipulation, or storage tasks, such as a computer or a server. A server computer may be equipped with any needed processing capability including one or more processors, such as a central processing unit (CPU), a graphics processing unit (GPU) or a digital signal processor (DSP), memory, including static and dynamic memory, and buses and input and output ports that are compliant with any handshaking, communications, or data transfer protocol. The physical hardware may also include storage devices, such as block-level storage devices, storage disks and tapes, networking equipment, and the like.

A virtualization layer executing on a server computer may include a bare metal hypervisor or a hosted hypervisor. The virtualization layer enables the physical hardware to be used to provide computing resources upon which one or more virtual computing resources may operate. For example, the virtualization layer enables a virtual machine executing in the virtual computing environment 106 to access physical hardware on the server computer through virtual device drivers or other executable code on the virtual machine. The virtualization layer may include a hypervisor or virtualization software and/or hardware. The virtualization layer may also include an instance of an operating system dedicated to administering a virtual computing resource implemented in physical resources of the server computer. The virtualization layer may also receive and process API calls from external devices or services. A virtualization layer may include a networking software stack for implementing network connectivity between the virtual computing resources executing on one server computer and other computing resources present or executing on other server computers.

The virtual computing environments enabled by the virtualization layer(s) may include various virtual computer components, such as one or more virtual CPUs, virtual memory, virtual disk storage, and the like. These virtual computer components, and other physical and virtual resources, may be discretized into instances of one or more virtual machines. The virtual machine or components thereof may be provided to the customers, end users, and/or other services inside or outside of the computing environment 100. For example, a server computer may host a first virtual machine instantiated from a first volume image and operated by a first customer and may host a second virtual machine instantiated from a second volume image that is operated by a second customer. Further, the computing environment 100 may use one or more of its own virtual machines for supporting execution of its applications and providing computing resources for such applications.

The security assessment system 114 may include one or more hardware or software services that perform individual tasks related to security assessments. Generally, the security assessment system 114 receives information that describes a security assessment to be performed on certain virtual computing resources, referred to herein as "target" computing resources 162, of a virtual computing environment 106; the security assessment system 114 coordinates the phases of performing the security assessment: configuration, wherein the security assessment system 114 prepares the virtual computing environment 106 hosting the target computing resources 162, and/or components thereof, to generate data, such as sensor results 166, as prescribed by the security assessment (e.g., by enabling and/or configuring sensors 164 that perform monitoring or other behavioral or configuration data collection actions upon virtual computing resources); activation, wherein the data (e.g., sensor results 166) collection is started, and the security assessment system 114 receives and processes the data; and, evaluation, wherein the security assessment system 114 executes, or coordinates the execution of, the rules in the rules package(s) associated with the security assessment against the data to produce assessment results 168 that may be delivered to the user for review, and/or may trigger other alerts or automated remediation of detected vulnerabilities. The present security assessment system 114 may be configured to execute a security assessment that uses rules packages and assessment configurations that may be provided by: an internal source that creates security assessments and rules packages according to "native" protocols and formats, ensuring the rules can be used to evaluate user data generated by system components (e.g., sensors 164); a credentialed user or an administrator of a user account; and, an external entity, such as a security assessments vendor or another producer (collectively "vendor" herein).

The data (e.g., sensor results 166) to be evaluated in the security assessment may include any information about the target computing resource(s) 162, its virtual computing environment 106, and its real-time operations, and may further include such information about other computing resources that the target computing resource 162 is configured to communicate with, provided the components performing the data collection (e.g., sensors 164, or the security assessment system 114 or a component thereof) are authenticated and permitted to discover and exchange such information in accordance with any applicable security policies. In various embodiments, therefore, the data may include, without limitation, information obtained from within the target computing resource 162 (e.g., a virtual machine instance), information obtained from other computing resources associated or in communication with the target computing resource 162, information obtained from one or more services operated by the computing resource service provider, or any combination of such information. Non-limiting examples of such data include: target computing resource configuration data, such as a virtual machine type, operating system/platform type, file system type, software packages installed and other file system contents, attached network interface(s) information, amounts of resources allocated, approved users (e.g., information about temporary credentials provided to the virtual machine instance for use with services offered by the service provider), firewall rules applied by the virtualization layer managing the instance, information from third-party providers that provide information about vulnerabilities, network flow logs, originating user and user profile information, uptime, virtual computing environment 106 topology, and the like; and, telemetry data describing real-time activity, such as process launch events, network connections and traffic, communications with other components of the computing environment 100, aggregated performance characteristics (e.g., reputation scores and other security risk estimates, or execution profiles describing how the target computing resource 162 typically runs, received from an anomaly detection service) and the like.

In some embodiments, the data may be sensor results 166 generated and/or collected by hardware computing devices executing one or more sensors 164. A sensor 164 is an executable program, a code snippet, a function, or another suitable discretized program source code, which when executed performs a very small set of one or more operations on the target computing resource 162 or on another aspect of the virtual computing environment 106 in order to collect or generate (as the sensor results 166 for that sensor 164) a data element or a small set of data elements describing the target computing resource 162 and/or its environment. Each sensor 164 can be authorized to access the virtual computing environment 106, or can be installed within the virtual computing environment 106; further, the sensors 164 may be authorized to access the target computing resource(s) 162, or to monitor the communications and/or other activity thereof, and additionally or alternatively may be installed directly on the target computing resource(s) 162, as described further below. For example, a sensor 164 may be installed on a virtual machine instance and, when executed, may return as its sensor results 166 the virtual machine instance's operating system. Various embodiments of a sensor 164 may be configured to communicate with other services and/or resources of the computing resource service provider. For example, a sensor 164 may include program code that, when executed by a processor, causes the processor to make an API call to a network service that has information about the network connections of the target computing resource 162; provided the requestor has the proper security credentials, the API is configured to send requested information back to the requestor. The sensor 164 may therefore require network connectivity enabling the processor to communicate with the network service, as well as credentials that give the executing processor permission to obtain the network service's information about the target computing resource 162. The retrieved information is the sensor results 166 for that sensor. The present system may employ any suitable number of specifically-configured sensors 164 to collect or generate the sensor results 166 needed for a security assessment of the target computing resource 162 at one or more levels of abstraction, including without limitation: evaluating a file on a virtual machine instance; evaluating the virtual machine instance itself (e.g., operating system, installed software packages, etc.); evaluating the virtual machine instance's network configurations; evaluating the security configuration of the virtual machine instance and its environment (e.g., is a certain port open, and if so, does an applied security policy require the port be open?); evaluating the network connections of the virtual machine instance to other resources; evaluating the other resources to which the virtual machine instance is connected; and, evaluating the virtual computing environment of the virtual machine instance.

In the configuration phase, the security assessment system 114 may receive the security assessment information, such as in the form of a security assessment run record 158 (e.g., generated from a default configuration of the security assessment), and may use the information to identify necessary parameters of the security assessment, such as the target computing resources 162, the rules package(s) to use, the scheduled start time, and the duration (i.e., length of time) to collect user data. The security assessment run record 158 may additionally include a list of the sensors 164 that return the user data needed to apply the rules package(s). Alternatively, the security assessment run record 158 may specify the user data needed, or the security assessment system 114 may determine the user data from the rules package. The security assessment system 114 may retrieve sensor information 110 describing the available sensors 164, such as the elements of user data that the sensor collects and returns; the security assessment system 114 may compare the needed user data to the identified user data in the sensor information 110 to determine which sensors 164 are needed.

At or before the scheduled start time, the security assessment system 114 may generate a command to the sensors 164, which instructs the required sensors to become active and start collecting/generating user data 166. The command may further include input parameters to one or more of the sensors 164. For example, the security assessment system 114 may pass, to a sensor 164 that searches for a particular file in the target computing resource 162 file system, the search path and/or the filename for the file. In one embodiment, the security assessment system 114 may send the command to the sensors 164 or to an interface of the virtual computing environment 106. In another embodiment, the sensors 164 or a security program that operates the sensors 164 (see below) may detect that the security assessment is ready to begin, and may request the sensor activation command from the security assessment system 114. Upon receipt of the command, the sensors 164 may be configured into an active or inactive state, and the active sensors 164 then may enter the activation phase and begin producing sensor results 166. The sensors 164 may collect and/or generate the sensor results 166 for the preset duration, and may—in real-time, at intervals, or once the duration has elapsed—send the sensor results 166 back to the security assessment system 114 for processing and evaluation.

The security assessment system 114 may enter the evaluation phase when it has received enough of the data produced by the data collection actions (i.e., the sensor results 166) to begin executing rules against the data. The security assessment system 114 may obtain the rules of the identified rules package(s) from a rules package data store 180 (e.g., by determining the location of the rules package as stored in the registry 190). The security assessment system 114 may in some embodiments apply a native rules package 182 to the raw sensor results 166, because the native rules package 182 can be written to interpret the raw sensor results 166. In contrast, to obscure certain data, methods of obtaining the data, or other aspects of the data from customized (i.e., "non-native") rules packages 184, 186, the raw sensor results 166 may be further processed, such as by extracting specific data elements or encrypting or anonymizing the sensor results 166, to produce assessment data as described below. The security assessment system 114 may use security assessment data objects 134 associated with sensor information 110 of the corresponding active sensors 164 to determine how to transform the sensor results 166 into assessment data, and/or to provide an interface between the assessment data and the rules package(s). These processes are described in detail with respect to the example illustrated in FIG. 1B.

Executing the rules (or causing the rules to be executed) against the sensor results 166 or assessment data produces assessment results 168 that describe the outcome of each rule's application to the conditions of the target computing resource(s) 162. The raw assessment results 168 may be displayed to the user (e.g., via user device 102) and/or may be stored in a data store 170 associated with the user account. Additionally or alternatively, the assessment results 168 may include the findings associated with each rule; a finding may include a severity level and a plain-English explanation of the assessment result, along with suggested remedies and/or prompts to execute automatic fixes for identified vulnerabilities.

The intake system 136 may include one or more hardware or software services for performing discrete tasks related to preparing customized security assessments and/or rules packages for use in the present system. The intake system 136 may receive a rules package, or configuration data for a security assessment that uses one or more rules packages, as a submission from a user (e.g., of user device 102) and/or from a vendor (e.g., using vendor device 108). The submission may be created in a user interface as described below, and/or may be contained in one or more files uploaded to or retrieved by the intake system 136. The intake system 136 may validate the submission as a security assessment or a rules package, such as by making a determination that the submission conforms to required formats and does not cause a security issue that must be resolved.

Some or all of the validation performed by the intake system 136 may be automated. For example, when the submission is a rules package, the intake system 136 may receive the security assessment data objects 134 and compare them to a security profile of the submitting user to identify all of the data types that the user is authorized to access; the intake system 136 may determine the submitted rules package is valid if all of the requested data types are authorized. Additionally or alternatively, the intake system 136 may communicate the submitted rules package to a curation system, whereby a curator (i.e., using curator device 118) that is familiar with the system's internal policies can determine whether the rules package is a valid and safe rules package. In another example, the intake system 136 may store a test data set, and may run the submitted security assessment and/or rules package(s) against the test data set; the test assessment results may be sent to the author (e.g., to vendor via vendor device 108) and/or to the curator (via curator device 118) in a user interface that prompts the recipient to enter user data indicating whether the test assessment results are accurate. If not, the intake system 136 may return the user input to the author for revisions.

The intake system 136 may register a validated security assessment or rules package by, for example, storing some or all of the submitted information in a registry 190. The registry 190 may be a database, a structured list, a lookup table, or another suitable data structure that can be stored in memory. The registry 190 may include entries for each rules packages and each security assessment validated by the intake system 136, as well as for each native rules package and each native security assessment. In some embodiments, the registry 190 may comprise two lists, separating the rules package entries from the security assessment entries; additionally, a security assessment entry may reference the entry of each of the rules packages it uses, and/or a rules package entry may reference the entry of each of the security assessments it is used in. Example registry 190 entry structures are described below. In addition to creating a new entry for a validated security assessment or rules package, the intake system 136 may check the registry 190 during the validation process to confirm that an identical or otherwise conflicting security assessment or rules package has not already been registered.

The intake system 136 may further register submissions by storing the data for each submission in the data store from which it will be retrieved. Thus, the intake system 136 may store the received rules package 182, 184 in an appropriate data store 180. In one embodiment, all rules packages may be stored in the same data store 180. In other embodiments, a vendor rules package 182 and/or a user rules package 184 may be stored in a data store associated with the package's author. In some embodiments, to register a submission the intake system 136 further creates a record that contains descriptive data, and may further contain configuration data, of the submission. For example, a vendor record for a vendor rules package 184 may include all of the submitted data required to create a point-of-sale display (e.g., a webpage, or an entry in a list of products) in the electronic marketplace 104, while a user record for a user rules package 186 may include all of the submission data needed by the user to determine what the rules package 186 does and where it is located. The intake system 136 may, for example, send vendor records 152 to the electronic marketplace 104 and a user record 158 to the appropriate user account data store 170 for storage and/or further processing.

FIG. 1A further illustrates APIs 112, 130 for accessing the security service environment 101 components thereof, and/or other services and data stores in the computing environment 100. An assessment API 112 connects to user devices 102 upon receiving security-related requests, such as requests to configure, purchase (i.e., from an electronic marketplace 104), execute, and/or review a security assessment. The assessment API 112 also connects to the services and data stores to which the requests pertain. An authoring API 130 connects to user devices 102 and/or "vendor" devices 108 upon receiving requests to create new, customized security assessments and rules packages. The authoring API 130 also connects to the intake system 136 that enables receipt and registration of customized security assessments and rules packages as described below. These connections by the APIs 112, 130 enable data exchange between the author of a security assessment or rule package, the security services that process, provision, and execute the security assessment/rules package as described herein, and the user who reviews and purchases or otherwise requests provisioning of the security assessment/rules package.

Each API 112, 130 may provide one or more suitable graphic user interfaces (GUIs) to the user devices 102 and to the vendor devices 108, and may be configured to receive and process input data as described herein. For example, the assessment API's 112 GUIs may enable one or more of the following user input functions: retrieve a display of security assessments and/or software packages available in the electronic marketplace 104 for purchase and/or download; retrieve data describing a security assessment from a data store 170 associated with the user; configure a security assessment (e.g., by identifying target computing resources and other parameters), and execute the security assessment; review security assessment results and findings; provide, to a vendor or to the system, feedback regarding the customer experience with a security assessment or rules package purchased from the vendor; and, the like. Non-limiting examples of user input functions that may be enabled via the authoring API's 130 GUIs include: retrieve sequential, hierarchical, or otherwise arranged prompts, and select from the provided options or otherwise enter data, in order to create rules for a rules package; retrieve and respond to similar prompts in order to create a security assessment; upload one or more files containing preconfigured rules packages and/or security assessments; receive messages regarding the status of input data validation; receive an indication whether or not a submitted security assessment or rules package has been registered; and, the like. In various embodiments, a single API, or additional APIs, may perform the described data processing; the various APIs may be inside or outside of the security service environment 101.

The electronic marketplace 104 may be a software-implemented service operating within the computing environment 100. Like the security service environment 101, the electronic marketplace 104 may be a part of the data infrastructure of the computing environment 100, such that the electronic marketplace 104 may be made available in multiple computing environments 100 of the computing resource service provider, without generating conflicting data. In some embodiments, the electronic marketplace 104 may reside on a web server of the computing resource service provider; a user device 102 can access the electronic marketplace 104 by loading a website associated with the electronic marketplace 104 within an internet browser. In other embodiments, the user device 102 may connect (i.e., over a suitable communication network) to the assessment API 112 or another API that is capable of displaying a visual representation of the electronic marketplace 104 at the user device 102. The electronic marketplace 104 displays, and allows the user to select, software and/or services that the user wishes to use in connection with the user's compute resources. In particular, the electronic marketplace 104 may make available all customized security assessments and rules packages that have a "public" visibility designation (i.e., all vendor records 152), while not including any with a "private" designation. In other embodiments, a user may additionally see in the electronic marketplace 104 any "private" customized security assessments and rules packages that the user already has access to. The electronic marketplace 104 may additionally make available all or a subset of the native security assessments and rules packages (i.e., via native records 150). In some embodiments, electronic marketplace 104 can provide any suitable functionality for discovering listed security assessments and rules packages. For example, electronic marketplace 104 can provide search functions, categorizations, recommendations, reviews, and filters (e.g., by price, provider, average review, etc.). As another example, electronic marketplace 104 can provide a function to act as an intermediary in a transaction between a user associated with the user device 102 and a provider (i.e., vendor) of a rules package associated with the vendor device 108. In some embodiments, electronic marketplace 104 can provide descriptive information about the various products and/or services offered through the marketplace. In some cases, the information can be information that was provided by a supplier of product and/or service being offered through electronic marketplace 104. Note that, although providers of security assessments and rules packages are generally described herein as vendors, this is not intended to indicate that the provider is always selling access; open source submissions can be listed using marketplace 104, and "vendor" is intended to include such a provider.

The electronic marketplace 104 may be configured to send usage data to the system or to the vendors with listed records. Alternatively, one or more services (e.g., assessment API 112 or authoring API 130) may request usage data from the electronic marketplace 104. The usage data for a product, such as number of views of the product's listing, number of purchases/downloads, and user feedback rating, may be stored (e.g., in the associated registry 190 entry), tracked, analyzed, and reported to the vendor and to the curator, optionally. When the user (via user device 102) selects a product to be provisioned, the electronic marketplace 104 sends some or all of the corresponding record to the assessment API 112. The assessment API 112 stores the provisioned record in the user account data store 170, and may further present the corresponding product to the user in a user interface for configuring the product, as described further below. In an example where the selected product is a rules package, the user may be prompted to select or create a security assessment that uses the new rules package. In an example where the selected product is a security assessment, the system may check whether the user has acquired the referenced rules packages (e.g., by checking the user account data store 170 for the corresponding records), and the user may be prompted to return to the electronic marketplace 104 and select/purchase the required rules packages. Additionally or alternatively, the electronic marketplace 104 may be configured to communicate with the user account data store 170 (e.g., via assessment API 112) to determine whether the user has acquired the required rules packages, and may prompt the user to include the required rules packages in the user's purchase/selection, so all required components are provisioned at once.

Figure 1B:
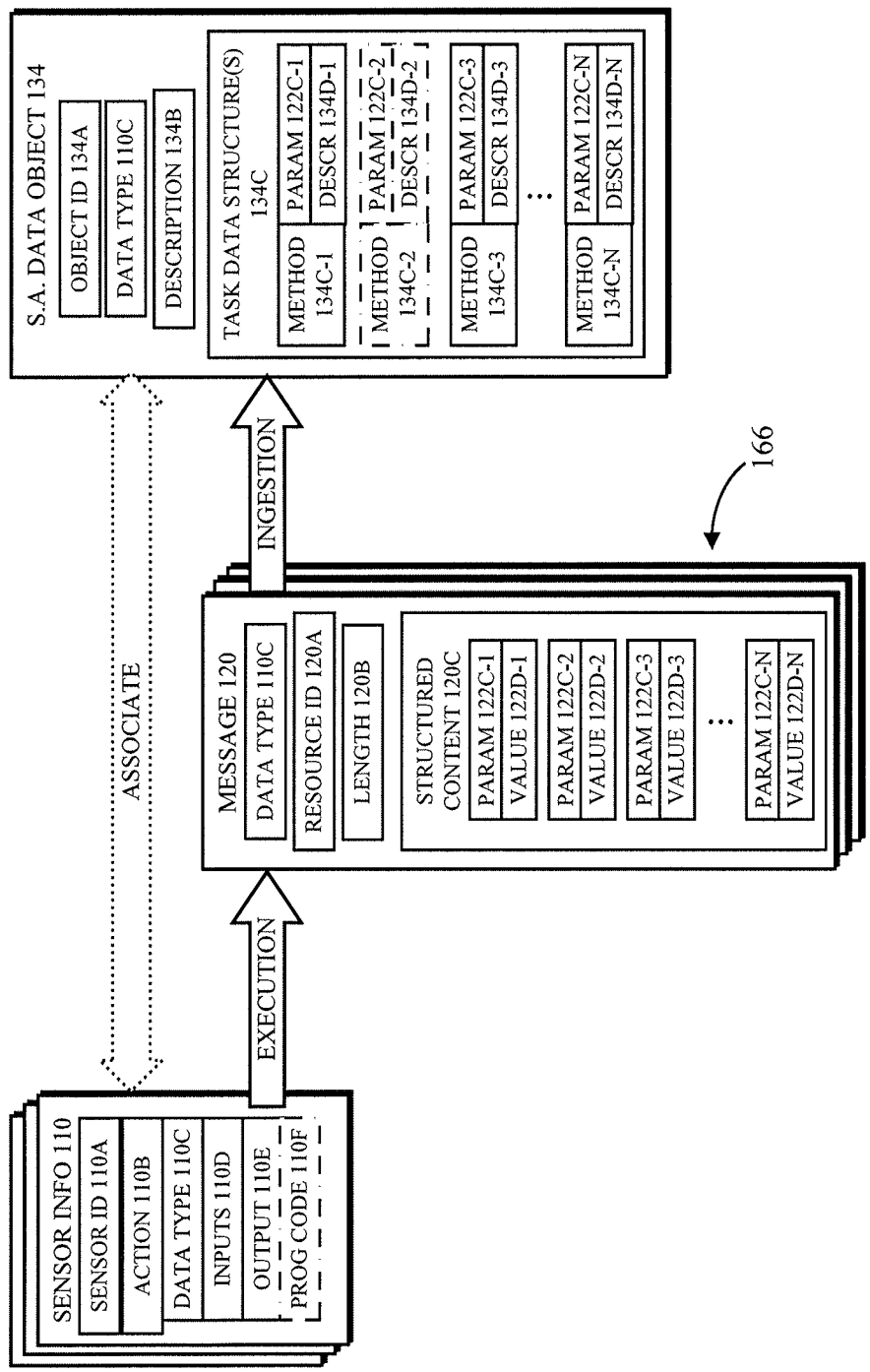
FIG. 1B is a diagram of an example set of associated data structures for exposing sensor results to customized rules packages for evaluation.

Referring to FIG. 1B, each sensor has corresponding sensor information 110 that is stored (e.g., in a sensor data store, a lookup table, or another suitable storage location) and may be accessible to the security assessment system as described in FIG. 1A. For example, the security assessment system may need a sensor identifier 110A of a deployed sensor in order to command that sensor to activate when a security assessment is beginning. Sensor information 110 may additionally identify one or more actions 110B that a corresponding deployed sensor can perform. An action collects or generates a particular element or set of elements as the sensor results. For example, an action can be "determine the operating system of the target virtual machine," or "identify all software packages installed on the target virtual machine," or "determine whether this software package is installed: XXX." Each action 110B may have a data type 110C identifying what kind of data is generated when the sensor performs the action 110B. The data type 110C may be passed with the output 110E (i.e., the sensor results 166) into a message 120 or similar data object, file, or data structure; the data type 110C may be used to associate a security assessment data object 134 with both the sensor information 110 and the output message 120, as described further below.

Each of a sensor's actions 110B may be defined by the program code 110F that is executed (e.g., by a security agent program as described below) to perform the action. The system may prevent or restrict access to the program code 110F, even as to the security assessment system; program code 110F updates may be pushed by secure channel communication directly to deployed sensors, in some embodiments. The security assessment system may need information about the inputs 110D to the program code 110F, in order to pass received input parameters into the program code 110F when it is called. The security assessment system may receive the output 110E of the program code 110F, in the form of one or more messages 120. A message 120 may include a reference to the data type 110C of action 110B that was performed to generate the message, and may also include a resource identifier 120A of, e.g., the target resource from which the sensor results were collected. The message 120 may keep the value of its own length 120B for data comparison and validation purposes. The sensor results generated as output 110E of the executing sensor may in some embodiments be arranged into structured content 120C (i.e., in the body of the message 120). In the illustrated example, the structured content 120C includes parameter-value pairs of each of the data elements the corresponding sensor is programmed to test for. That is, each parameter 122C-1, 122C-2, 122C-3, . . . , 122C-N tested by the sensor is associated with the corresponding value 122D-1, 122D-2, 122D-3, . . . , 122D-N that the sensor obtained, received, or generated when testing for the parameter.

Sensors, target computing resources (which may be any physical or virtual resources accessible via the virtual computing environment), and the virtual computing environment itself may be implemented using data structures, access and security protocols, daemons and other background processes, source code, configurations and settings, physical and virtual machines, and physical and virtual locations that can include or produce sensitive information. Non-limiting examples of such sensitive information include: identifiers for user accounts, virtual machine instances, processes, sensors, mounted logical volumes, physical computing devices, payment instruments, etc.; file names, paths, permissions, and other file system information; command line parameters; and personal information, such as names, employee IDs, email addresses, and the like. In some embodiments, the output 110E of one or more of the sensors may include data that the computing resource service provider does not want to expose to non-internal authors of rules packages and security assessments (even when the native rules packages are allowed to evaluate it). The present system provides a set of security assessment data objects 134 that deny access to, omit, obscure, mask, anonymize, encrypt, or otherwise hide sensor results from such authors.

A security assessment data object 134 may comprise program code and/or executable instructions, as well as data elements; the security assessment data object 134 may be a JavaScript object, a code snippet, a JSON or OVAL object, or another suitable type of object. The security assessment data object 134 may have its own object identifier 134A, and may also include a data field storing a description 134B explaining what elements of sensor results are exposed to the author when the particular security assessment data object is used. Using the data type 110C, the security assessment data object 134 is associated with a particular action 110B that one or more sensors can perform. The security assessment data object 134 additionally includes one or more task data structures 134C. Each task data structure 134C may comprise: a retrieval method 134C-1, 134C-3, . . . , 134C-N (i.e., an executable function) for retrieving at least one data element (i.e., parameter) out of the structured content 120C of a message 120; the parameter 122C-1, 122C-3, . . . , 122C-N that the retrieval method is retrieving; and, a description 134D-1, 134D-3, . . . , 134D-N of which data element is retrieved.

In some embodiments, the security assessment data object 134 may include a task data structure 134C for each of the parameter-value pairs in the message 120. Consequently, all of the data elements obtained by the sensor and placed in the message 120 may be exposed to the non-internal authors. Alternatively, the intake system or another service may access a security profile of an author to determine which of the data elements should be exposed to the author; data elements that the author is not authorized to access may be hidden from the author, and/or requests by the author to access such data elements may be denied. In other embodiments, such as that illustrated, the task data structures 134C only include retrieval methods for the data elements that are needed to perform the security assessment. For example, method 134C-2 may not be available to the authors, so that the corresponding parameter 122C-2 cannot be evaluated by a rule.

Figure 2A:
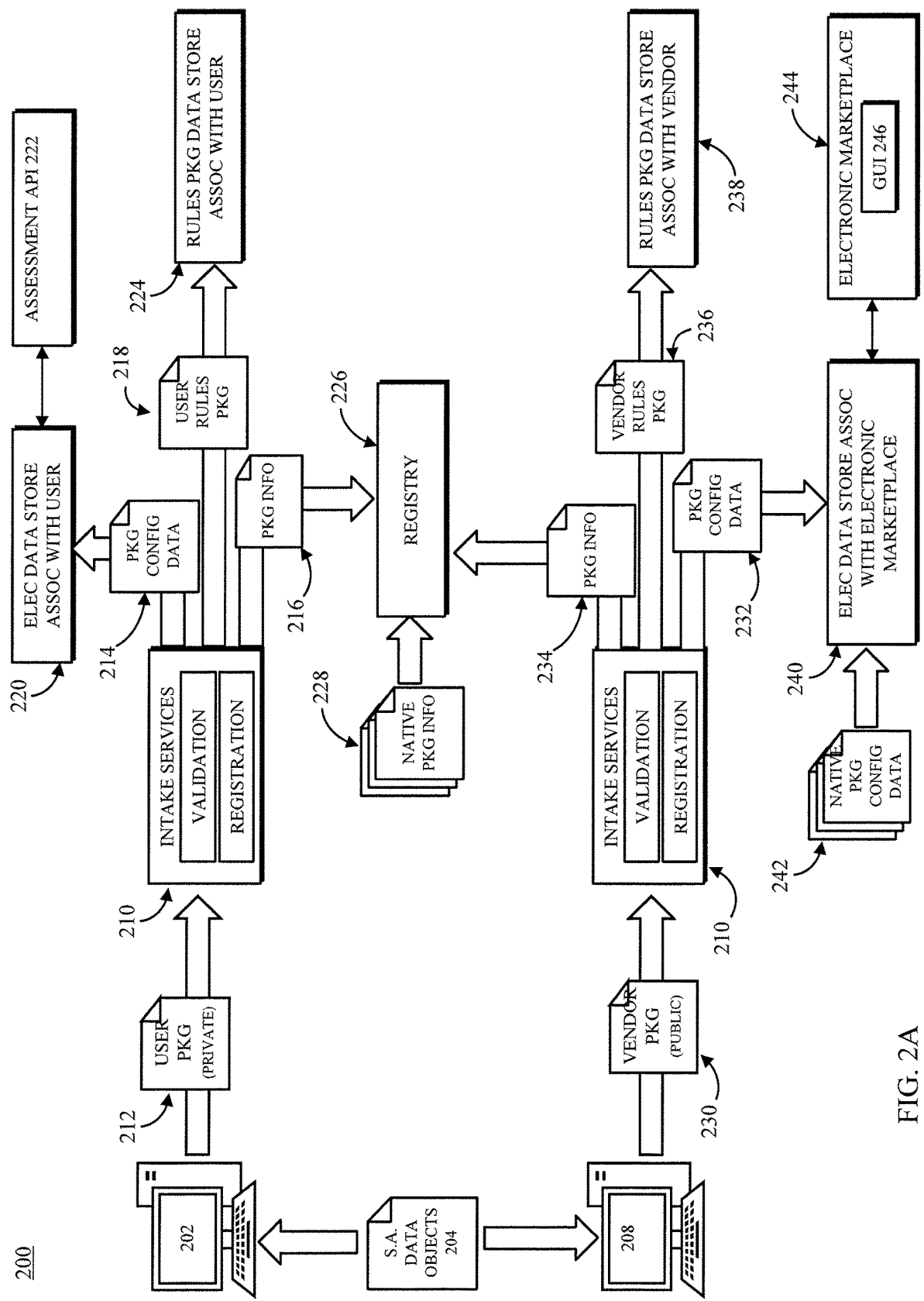
FIG. 2A is a diagram of an example data flow within a system for creating customized rules packages, in accordance with the present disclosure.

Referring to FIG. 2A, an example flow of data within a computing environment 200 shows the intake of native and user- or vendor-provided rules packages into a system like that described above with respect to FIGS. 1A-B. One or more security assessment data objects 204 may be used to expose desired elements of sensor results to, and to conceal sensitive information and unwanted or unnecessary elements of sensor results from, a customer (using user device 202) and a vendor (using vendor device 208). For example, the security assessment data objects 204 may be formatted for display in a GUI, such as to show the prospective author the descriptions of the security assessment data objects 204 as well as the available retrieval methods. Based on the data types associated with the sensor results and the tasks that can be performed to collect particular data elements, the user creates one or more rules that operate on the collected data. The user may enter additional information for the rules package, such as a visibility setting; in the illustrated example, the customer generated a private user package 212, and the vendor generated a public vendor package 230. Other data may be included in the packages 212, 230, such as purchasing information, use restrictions, and the like. Additionally, each user may create or upload a security assessment that uses the new rules package, and the security assessment, or data representing the security assessment (e.g., configuration parameters) may be included in the package 212, 230.

Intake services 210 receive the packages 212, 230 on behalf of the system, as described above. The packages 212, 230 may be validated, and then are registered. In one embodiment, as illustrated, the registration service: extracts the rules packages 218, 236 from the submitted packages 212, 230; sends the user rules package 218 to a data store 224 associated with the user; sends the vendor rules package 236 to a data store 238 associated with the vendor; creates a configuration data record 214, 232 which can be retrieved later and used to configure the corresponding rules packages and/or security assessments; stores the user configuration data record 214 in an electronic data store 220 associated with the customer (and in communication with the assessment API 222), and stores the vendor configuration data record 232 in an electronic data store 240 associated with the electronic marketplace 244 (see numeral 104 of FIG. 1A); creates one or more registry entries 216 for the user package 212 (e.g., one for the user rules package 224, and one for the security assessment (not shown)); creates one or more registry entries 234 for the vendor package 230; and stores the registry entries 216, 234 in the registry 226.

Information for one or more of the native rules packages and/or security assessments may also be registered with the system (i.e., in the registry 226) and with the electronic marketplace 244. For example, the computing resource service provider may make available a "native" rules package and one or more security assessments for evaluating Common Vulnerabilities and Exposures (CVE), a standardized list of known security issues. The intake services 210 or another service may produce one or more configuration data records 242 to be stored in the electronic data store 240, so that the native CVE rules package and/or the security assessments are made available to customers in the electronic marketplace 244 (note that configuration data records 214, 232, 242 include descriptive data that is displayed in listings (e.g., in the GUI 246 of the electronic marketplace 244) of the corresponding package). Further, the intake services 210 or another service may produce the corresponding registry entries 228 to be stored in the registry 226, so the native CVE rules package and/or CVE security assessments are registered for use in the system.

Figure 2B:
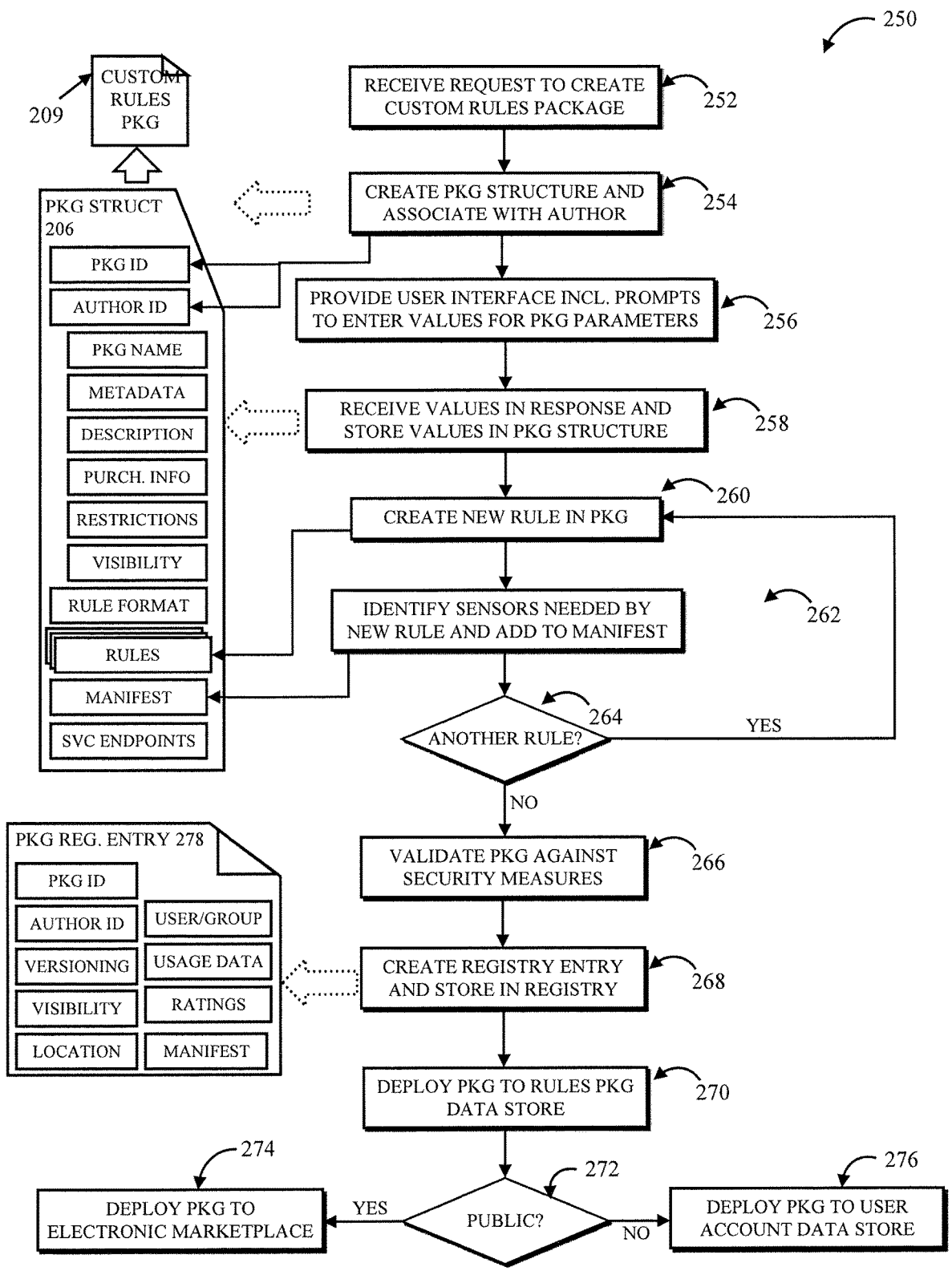
FIG. 2B is a flow diagram of an example method for intaking a customized rules package via a user interface, within, for example, the system of FIG. 2A.

FIG. 2B illustrates an example method 250 of enabling a user, which may be a customer, a credentialed user, a vendor, or another third party authorized to use the system, to create a customized rules package 209. The user may be associated with a user account, such as a customer account or a vendor account, and is referred to herein as the "author" of the submitted package (though it is contemplated that the rules package may be authored by another entity at some previous time, and the "author" is merely submitting it to the system). At 252, the system receives a request from a user device, which may be connected through a communication channel to an API (e.g., authoring API 130 of FIG. 1A) of the system. At 254, the system creates a new package structure and associates the package structure with the author. An example package structure 206 is illustrated, and may be implemented using any suitable object or data structure programming, such as a database, XML or other markup language file, JSON object, and the like. The package structure 206 includes a plurality of fields representing parameters of the package. In some embodiments, the new package 209 may be associated with the author by creating a package identifier, obtaining an identifier of the author (e.g., a username), and storing the package identifier and the author identifier in the package structure 206.

At 256, the system may generate and send to the user device a user interface that enables the author to enter values for the parameters of the rules package. Example parameters include: information for describing the rules package and/or associated security assessment, which may be displayed when the package is listed in the electronic marketplace or in the user's security dashboard, and may include a name of the package, a description of what it does, requirements for use, price and other purchase information, and the like; a visibility setting, which may be used to determine which other users have access to the package; a rule format identifying the rules' programming language, operating system, etc.; and, service endpoints identifying the storage location(s) of data used by the rules package, as described further below. At 258, the system may receive the values entered by the user and store them in the package structure 206.

Figure 2C:
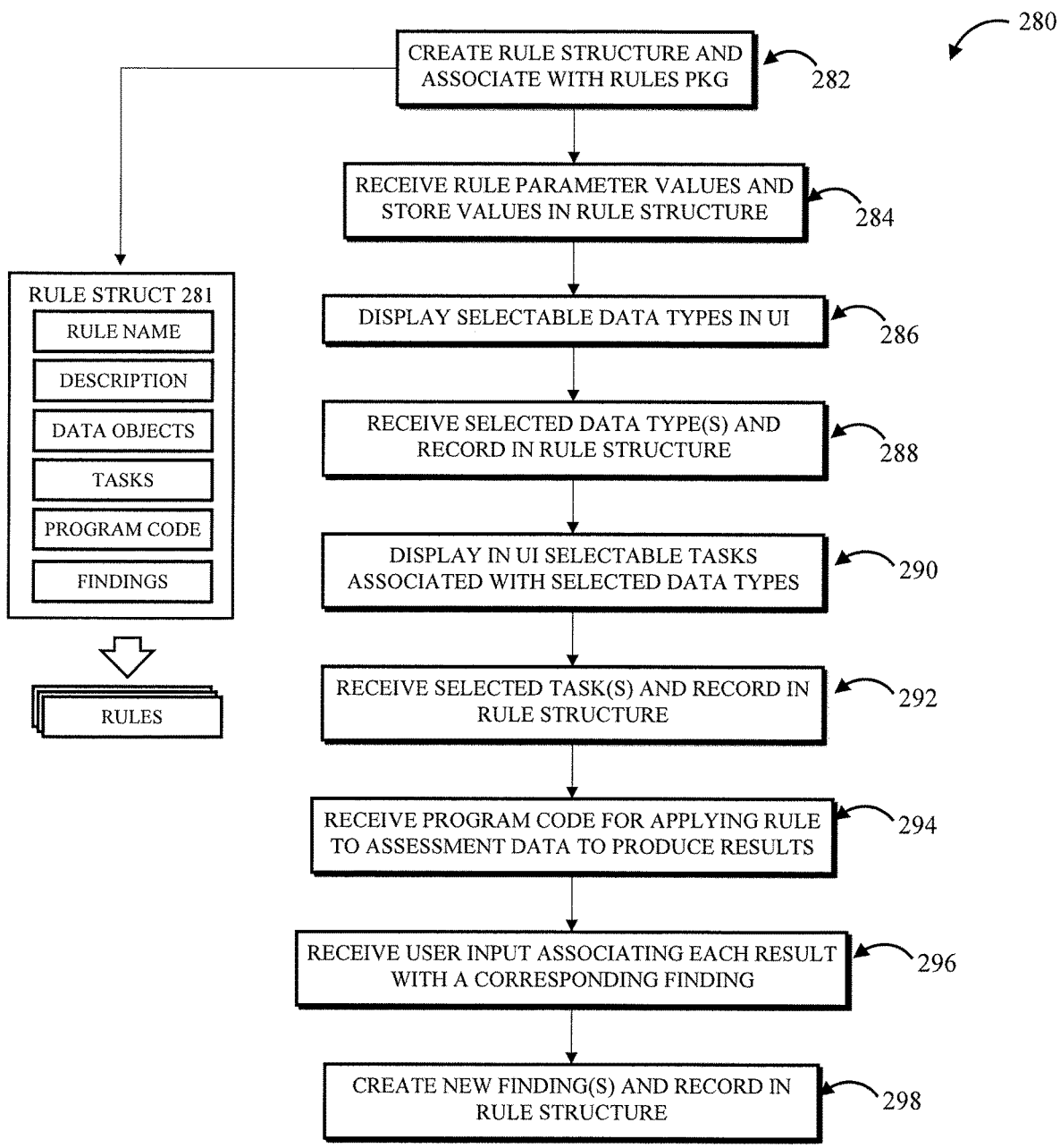
FIG. 2C is a flow diagram of an example method for creating a rule within a rules package in accordance with FIG. 2B.

At 260, the system may interact with the user device to perform a routine for creating a new rule for the rules package. In some embodiments, the rule may be created by the author uploading one or more files containing some or all of the rules for the rules package. In this case, the system may confirm that the file(s) contain readable rules—for example, that the rules are in the author-supplied rule format, do not contain any coding errors, and in some embodiments also conform to the expected structure of a rule—and then may add the uploaded rules to the package structure 206. In other embodiments, the system may receive the rule parameters via the user interface. FIG. 2C illustrates an example method 280 of creating a new rule (as in step 260) with the user interface. At 282, the system creates a new rule structure 281 and associates it with the new package structure. At 284, the system receives user input identifying values for the parameters of the rule structure 281, such as a name and a description for the rule. At 286, the system may update the GUI to display the data types (i.e., of the collected data) that can be accessed by the rules package. For example, the data types may be displayed as categories of information that can be retrieved; a non-limiting example list of categories for telemetry/configuration in a virtual machine includes specific file information, machine information (e.g., operating system, file system, installed software packages), machine configuration (e.g., network configuration, security configuration), environment configuration (e.g., security configuration of the virtual computing environment), and network activity (e.g., in-environment network connections, remote/external connections, network traffic).

At 288, the system may receive the selected data type(s) from the user device, identify the associated security assessment data objects, and store in the rule structure 281 information identifying which data objects are used by the rule. The system may additionally identify which tasks are associated with the selected data structures, and at 290 may update the GUI to display the associated tasks for selection. For example, the GUI may display the name of the associated retrieval method(s) and/or a description of the data element(s) the method(s) retrieve. Some tasks are associated with sensors that require input parameters, such as a task to retrieve information for a specific file (e.g., having a "get_fileinfo(XXX)" retrieval method). The GUI may provide one or more text fields with prompts to the author to enter identifying information of the file, such as the filename and/or path. At 292, the system may receive the selected tasks and any input parameters from the user device, and may record the user input in the rule structure 281.

At 294, if the security assessment system will execute the rules against the sensor results internally (e.g., within the security service environment), the system may receive the program code of the rule, and store the program code in the rule structure 281. The program code may be an executable file or widget, a code snippet, a function or set of functions, and the like, which is in the rule format specified by the author. At 296, the system may receive additional user input associating each potential result of executing the program code against the assessment data with a "finding" describing the result. As explained above, a finding may have a severity level, a description, and one or more actions that must be taken or recommended based on the outcome of the security assessment. At 298, the system may create a data structure for each finding and store the findings in the rule structure 281.

In some embodiments, evaluations using the rules package may not be executed by the system's security assessment system, but rather by computing resources within the author's own computing environment, as described further below. For such a rules package, the "expected structure" of a rule may not include the parameters as in FIG. 2C. Instead, for example, the rule may simply contain the information that the system needs to identify which sensors and/or which security assessment data objects will be needed by the rules. In one embodiment, the author may provide a list of the retrieval methods that the rules will call. In another embodiment, the author may select the tasks in the user interface, and the system may identify the associated retrieval methods and/or data objects as described herein.

Returning to FIG. 2B, after a new rule is created, at 262 the system may identify the sensors that produce the data elements the new rule operates upon. The system may use the association (shown by example in FIG. 1B) of the security assessment data objects with the sensor information to do this, in some embodiments. For example, the system may determine the data objects referenced in the rule structure, and use the data types of the data objects to identify the sensors having the same data types. In another example, the system may determine the tasks referenced in the rule structure, and may identify the retrieval methods associated with the tasks. Each retrieval method may be associated with the corresponding sensors that produce the parameter values that the retrieval method returns, and the system may identify the sensors accordingly. Additionally or alternatively, the system may identify the parameter(s) retrieved by the retrieval method, and may identify each sensor that produces that/those parameter(s). The system creates a manifest listing the sensors (e.g., by sensor ID) and adds the newly identified sensors to the manifest. For sensors that require input parameters, the system may obtain the author-provided input parameter values from the rule structure and include them in the manifest.

At 264, the system may query the author whether to add another rule to the rules package. If so, the system returns to 260. If not, at 266 the system may validate the completed package, using the validation measures described above and any other suitable validation measure. For example, the system may check that the submitted rules attempt to retrieve only data types that are permitted, and that the rules do not attempt to send data outside of the system in an unauthorized manner. Additionally, the system may send the package to a curator to verify that the rules do not violate any security protocols.

At 268, the system may create a registry entry 278 for the package and store the entry in the registry. The registry may be used by multiple components of the security system. The security assessment system may receive the package identifier and query the registry entry 278 to get the manifest and/or to determine the storage location of the rules package. The electronic marketplace may get version information and ratings from the registry entry 278, and may store usage data and user feedback (e.g., ratings) in the registry entry 278. Various APIs may use the registry entry 278 to determine which users, user groups, or security groups can use the rules package, and whether each has full or limited access. At 270, the system may send the rules package, comprising the rules and identifying information, to a data store. At 272, the system may check the visibility setting of the package and deploy the package accordingly. In one embodiment, if the visibility is "public," at 274 the system sends all or some of the package (e.g., the configuration data as described above with respect to FIG. 2A) to the electronic marketplace; if not, at 276 the system sends all or some of the package to the user account data store.

Figure 3A:
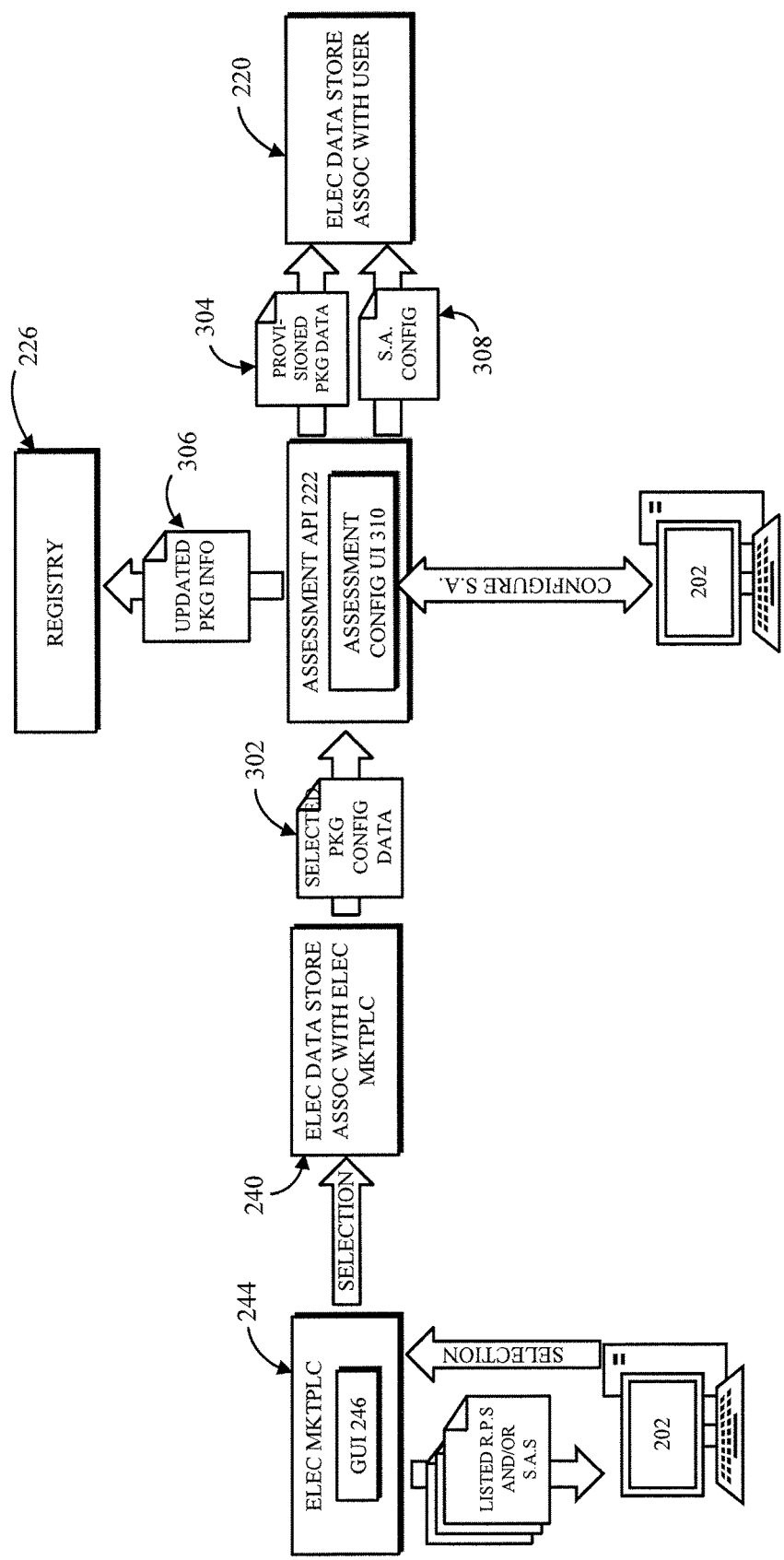
FIG. 3A is a diagram of an example data flow within a system for provisioning a customized rules package via an electronic marketplace, in accordance with the present disclosure.

FIG. 3A illustrates an example data flow between system components in the computing environment 200 during provisioning of a security assessment and/or a rules package from the electronic marketplace 244 to a user's account. A GUI 246 for the electronic marketplace 244 is provided (by the electronic marketplace 244 or by the assessment API or another API) to a connected user device 202 of the user. The GUI displays the security assessments and/or rules packages that are available for the user to purchase/select from the electronic marketplace 244. In response to a selection, the configuration data record 302 for the selected package is obtained from the electronic data store 240 by the assessment API 222. In one embodiment, the assessment API 222 may simply save the selected package information to the electronic data store 220 associated with the user. Alternatively, the assessment API 222 may enable the user to configure a security assessment using the selected package, such as via a configuration GUI 310. For example, if a rules package was selected for provisioning, the assessment API 222 may enable the user to create a new security assessment that will use the rules package (and other rules packages, if needed and if available to the user). In another example, if a security assessment or a packaged security assessment and rules package was selected, the assessment API 222 may present the newly acquired security assessment to the user for customization.

When the user has finished configuring the security assessment 308 and associated rules package, the assessment API 222 may send the "provisioned" package data 304 and the security assessment 308 to the electronic data store 220. The provisioned package data may include data associating the rules package with the user and configuration data rendering the rules package compatible with the user's assessment targets. The assessment API 222 may further send updated package information 306 to the registry 226, for example to update usage information such as the number of users that have downloaded the package. In some embodiments, the assessment API 222 may further provision, to the virtual computing environment of the user, components that collect the data needed for the security assessment. For example, when the assessment API 222 receives the configuration data 302 for the user's electronic marketplace 244 selection (i.e., a selected rules package or security assessment), the assessment API 222 may identify the needed sensors and cause them to be installed in or otherwise associated with the user's virtual computing environment. In another example, once the user identifies the target computing resource of the security assessment, the assessment API 222 may identify the needed sensors and cause them to be installed on the target computing resource (e.g., downloaded by a security agent program as described below). An example process of provisioning these active sensors via the present security assessment system is described below with respect to FIGS. 4A-B.

Figure 3B:
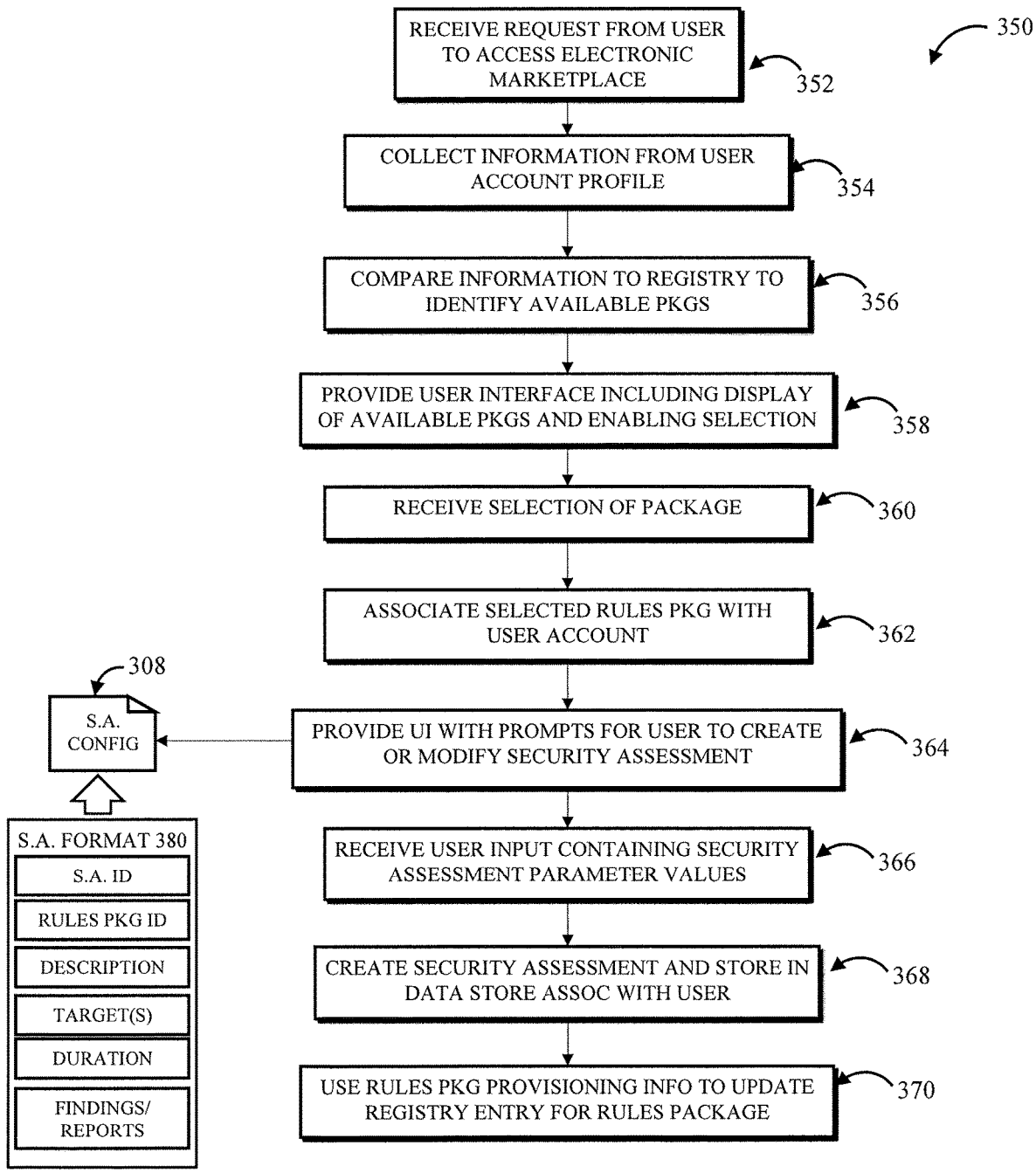
FIG. 3B is a flow diagram of an example method for provisioning a customized rules package within, for example, the system of FIG. 3A.

FIG. 3B illustrates an example method 350 of provisioning a selected package in accordance with the system of FIG. 3A. At 352, the system receives a request from the user device to access the electronic marketplace. In some embodiments, the system may determine which packages in the registry and/or in the electronic marketplace can be made available to the user (e.g., in light of use restrictions and/or security policies). Thus, at 354 the system may retrieve information about the user, such as a user profile stored in association with the user's account. This information may identify security groups the user belongs to, for example. The system may, at 256, compare this information to the registry entries to identify the packages that are available to the user. At 358, the system may configure the electronic marketplace to display the available packages, including security assessments and rules packages, to the user in a GUI.

At 360, the system may receive the user's selection of one or more listed security assessments and/or rules packages. In one example, the user may select a security assessment, and the GUI may indicate which listed rules packages are needed to run the security assessment; the user may then select the required rules packages if the user has not already requested that they be provisioned. Thus, the "package" selected by the user for provisioning includes any security assessments and all of the selected rules packages that still need to be provisioned. At 362, the system may associate the package, or each component (i.e., security assessment and rules package) of the package, with the user account. For example, the system may update or modify settings associated with the rules packages so they can be executed against the sensor results generated from the user's assessment targets, producing provisioned package configuration data that the system stored in the user account data store.

At 364, the system may interact with the user via a GUI that enables the user to create and/or modify instances of the security assessments. In one embodiment, a security assessment 308 may be created by the author of the provisioned package, and may be included in the data obtained from the electronic marketplace. In another embodiment, the security assessment 308 may be a standard set of configuration parameters provided by the computing resource service provider. In still another embodiment, the security assessment 308 may be created by the user in conjunction with step 364. An example security assessment format 380 illustrates one possible structure of a security assessment 308. The security assessment 308 has a static identifier and a plurality of parameters that can be set or modified by the user. These include, without limitation: rules package identifiers for the rules packages that the security assessment uses; a text description of what the security assessment does; identifiers of one or more target computing resources that the security assessment will assess; a duration of the security assessment (indicating, e.g., how long or on what schedule the sensors should monitor the targets and generate sensor results); and, configuration settings for presenting findings and/or assessment reports.

At 366, the system may receive user input comprising the customization of the security assessment, and at 368 the system may produce (i.e., create or modify) a record for the security assessment and store it in the user account data store. At 370, the system may use the information collected during provisioning to update the registry entry for the newly provisioned components, such as by updating usage data as described above.

Figure 4A:
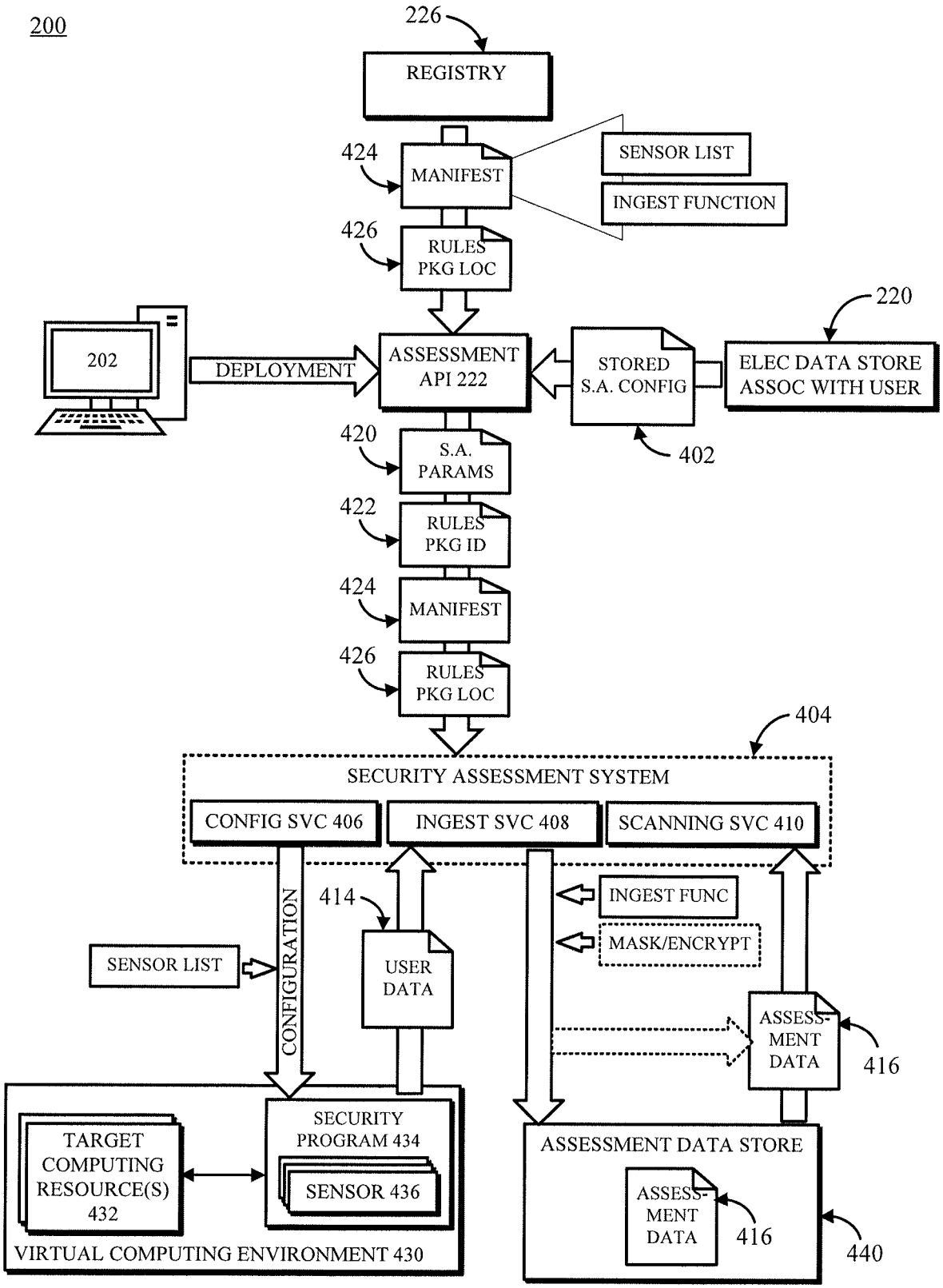
FIGS. 4A and 5A are diagrams of an example data flow within a system for performing a customized security assessment that uses a customized rules package on computing resources within a virtual computing environment, in accordance with the present disclosure.

FIG. 4A illustrates an example data flow between system components in the computing environment 200 when a security assessment is deployed to evaluate target computing resources 432 in a virtual computing environment 430 of the user. The user may connect the user device 202 to the assessment API 222 (e.g., over the internet or another computer network; in some embodiments, the API 222 can provided a RESTful interface for submitting requests to set security options and in other embodiments the assessment API 222 may provide a "dashboard" control panel or other web application for customizing the computing resource service environment's security services) and may issue a deployment command identifying the security assessment to be performed. The assessment API 222 retrieves the associated security assessment 402 from the user's electronic data store 220. Additional data, such as the manifest 424 and the rules package location 426, may be obtained from the registry 226. For example, the registry entry for the security assessment 402 may contain the manifest 424, including a sensor list for the security assessment, and the identifier(s) of the rules package(s) needed by the security assessment; the rules package identifier may then be used to look up the registry entry for the rules package and obtain the rules package location 426. Or, the security assessment's 402 registry entry may only identify the rules package(s), and the manifest 424 may be assembled from the corresponding manifests of each of the rules packages, which are stored in their registry entries.

The assessment API 222 sends the security assessment parameters 420 (e.g., target identifiers, duration), rules package identifier(s) 422, manifest 424, and rules package location(s) 426 to the security assessment system 404. The security assessment system 404 may be implemented and configured as described above with respect to the security assessment system 114 of FIG. 1A. In one embodiment, the security assessment system 404 includes services for performing the phases of a security assessment: a configuration service 406, an ingestion service 408, and a scanning service 410. The configuration service 406 may configure the security components deployed within the virtual computing environment 430 to collect the data (i.e., sensor results comprising configuration and/or telemetry data) needed for the security assessment. For example, the configuration service 406 may generate and send one or more configuration commands. In one embodiment, a single configuration command may be sent to all sensors 436, or to the sensors 436 that should be activated, or to a security agent program 434 that controls the sensors 436 as described below. The single command may list sensors 436 to be activated, along with the sensor input parameter values for the corresponding sensors 436; further, the command may include execution information such as the identifiers of the target computing resource(s) 432, a time to begin the data collection, and the duration of the data collection. In some embodiments, the sensors 436 may be dedicated to the computing resources identified as targets, such as when the sensors are installed on a virtual machine instance; here, the identifiers of the target computing resource(s) 432 may be omitted from the command, as they are not necessary—the configuration service 406 instead identifies the appropriate deployed sensors 436 to receive the command. In other embodiments, the configuration service 406 may send a configuration command for each sensor 436 to be activated. In some embodiments, the configuration command can be sent to the security agent program 434 directing the program to start the sensor and if the sensor is not present, for the agent to download the sensor. For example, the sensor could be a plug-in to the agent and the configuration command may specify the agent and a location to obtain the agent from that can be used if it is not already installed.

The security agent program 434 may be a software application or software package that can be activated by the security assessment system 404 (i.e., the configuration service 406) to discover configuration information and to monitor activity of the target computing resources 432. The security agent program 434 may be installed in the virtual computing environment 430 by the user or by the configuration service 406 or another service. For example, the security agent program 434 may be installed on a virtual machine instance, including on the target computing resource 432 itself. The security agent program 434 may be granted communication privileges to allow it to receive commands from the configuration service 406 and to send collected data (e.g., sensor results 414) out of the virtual computing environment 430 to the security assessment system 404. In some embodiments, the security agent program 434 may be a background process, such as a daemon in a UNIX virtual machine instance, which cannot be started, stopped, or modified by users that are logged into the virtual machine instance. The security agent program 434 may include the sensors 436, and may be the only device that can communicate with the sensors 436. Thus, in some embodiments, the configuration service 406 may send the configuration command to the security agent program 434, which activates the appropriate sensors 436 in accordance with the command.

The configuration command may instruct the security agent program 434 to start the data collection immediately; or, the command may indicate the start time, and the security agent program 434 may begin the data collection automatically at the start time; or, the configuration service 406 may send an "execute" command to activate the data collection at the appropriate time. The security agent program then coordinates the execution of the active sensors 436 and the collection and transmission of the sensor results 414 generated by the sensors. In one embodiment, the security agent program 434 may execute the program code of the sensors 436, each of which returns a message containing the collected sensor results (i.e., data elements selected and structured in the format of the corresponding data type). Different sensors 436 are activated at different times, with different frequencies, in response to different events. For example, a sensor for detecting the virtual machine instance's operating system may execute immediately and only once, while a network traffic sensor may activate repeatedly at a desired interval, and a process launch sensor may active every time a process is launched in the target computing resource 432.

In one embodiment, a message is generated and delivered into a first-in-first-out message relay queue of the security agent program 434, and the security agent program 434 may continuously pull messages from the front of the queue and transmit them to the security assessment system 404. This allows the sensors 436 to operate asynchronously. In another embodiment, the security agent program 434 may accumulate all of the messages for the specified duration, and may transmit all of the sensor results 414 once the duration has elapsed. The security agent program 434 may communicate with the security assessment system 404 over a secure channel, such as a Transport Layer Security encrypted channel where the security agent program 434 and the security assessment system 404 have the necessary keys to encrypt and decrypt the sensor results 414.

The ingestion service 408 receives (and may decrypt) the sensor results 414 and may convert the sensor results 414 to assessment data 416. In some embodiments, the system is sufficiently secure, and the security assessment is performed internally without the potential for exposure or exfiltration of data; here, native rules packages can operate efficiently on the raw sensor results 414, so the ingestion service 408 may pass the sensor results 414 to the scanning service 410 without performing the conversion. For customized rules packages, or in less secure environments, the ingestion service 408 may ingest the sensor results 414 by extracting parameter-value pairs from the sensor results 414 and storing them in the proper fields in (i.e., "populating") the security assessment data objects used by the rules package. For example, the ingestion service 408 may pass each incoming message into an ingestion function that takes the message data as input parameters, and returns a corresponding data object that, having the structure of one of the security assessment data objects and containing the data elements originally returned in the sensor results that the data object's retrieval methods are programmed to retrieve, abstracts the message format and hides the information that should not be exposed to the rules.

More particularly with respect to this example, the ingestion service 408 may be configured to parse the message (e.g., a JSON object) into its data type, its length, and its structured content (e.g., parameter-value pairs). The ingestion service 408 may ignore certain data types, such as data types that contain only sensitive information. For desired data types, the ingestion service 408 may call the ingestion function with the data type, length, and structured content as arguments. The ingestion function is programmed to associate each of the possible data types with a corresponding one of the plurality of preconfigured security assessment data objects. The ingestion function then determines which parameter-value pairs in a message of the instant data type are retained, based on the fields of the associated security assessment data object. In one embodiment, the ingestion function may create a new data object (e.g., a JavaScript object) having the fields and retrieval methods of the identified security assessment data object, and copies the identified parameter-value pairs into the appropriate fields. Additionally or alternatively, the data elements extracted using the ingesting function may be stored in a database for later retrieval. In this manner, the format of the messages generated by the sensors can be changed without having to change the format of the data objects accessed by the customized rules package; only the ingestion service 408 and ingestion function would need to be updated to accommodate the changes, which would be invisible to the users of the rules packages.

Concurrently with, or subsequently to, producing the data objects, the ingestion service 408 may also remove, mask, or encrypt certain data elements of the sensor results and/or encrypt the data objects to secure any remaining sensitive data. This step may be optional: in some embodiments, such as the illustrated example, the assessment is performed by system services that are internal to the computing resource service provider and pose no security risk related to receiving the sensitive data, and the sensitive data may not be removed, masked, or encrypted; in other embodiments, the assessment is performed by services under the control of a vendor (see FIGS. 6 and 9), and sensitive data may be removed, masked, or encrypted by default or depending upon the security permissions of the vendor. In still other embodiments, the ingestion service 408 may remove, mask, or encrypt sensitive data based on a security profile of, or permissions granted to, the scanning service 410. Details of the masking/encryption are discussed below with respect to FIGS. 6 and 9. The resulting assessment data 416 comprising the data objects may be delivered immediately to the scanning service 410, or may be stored in an assessment data store 440 temporarily. In some embodiments, the ingestion service 408 may send a location (e.g., a URL or address within the assessment data store 440) and/or an identifier of the assessment data 416 to the scanning service 410 for later retrieval of the assessment data 416.

Figure 4B:
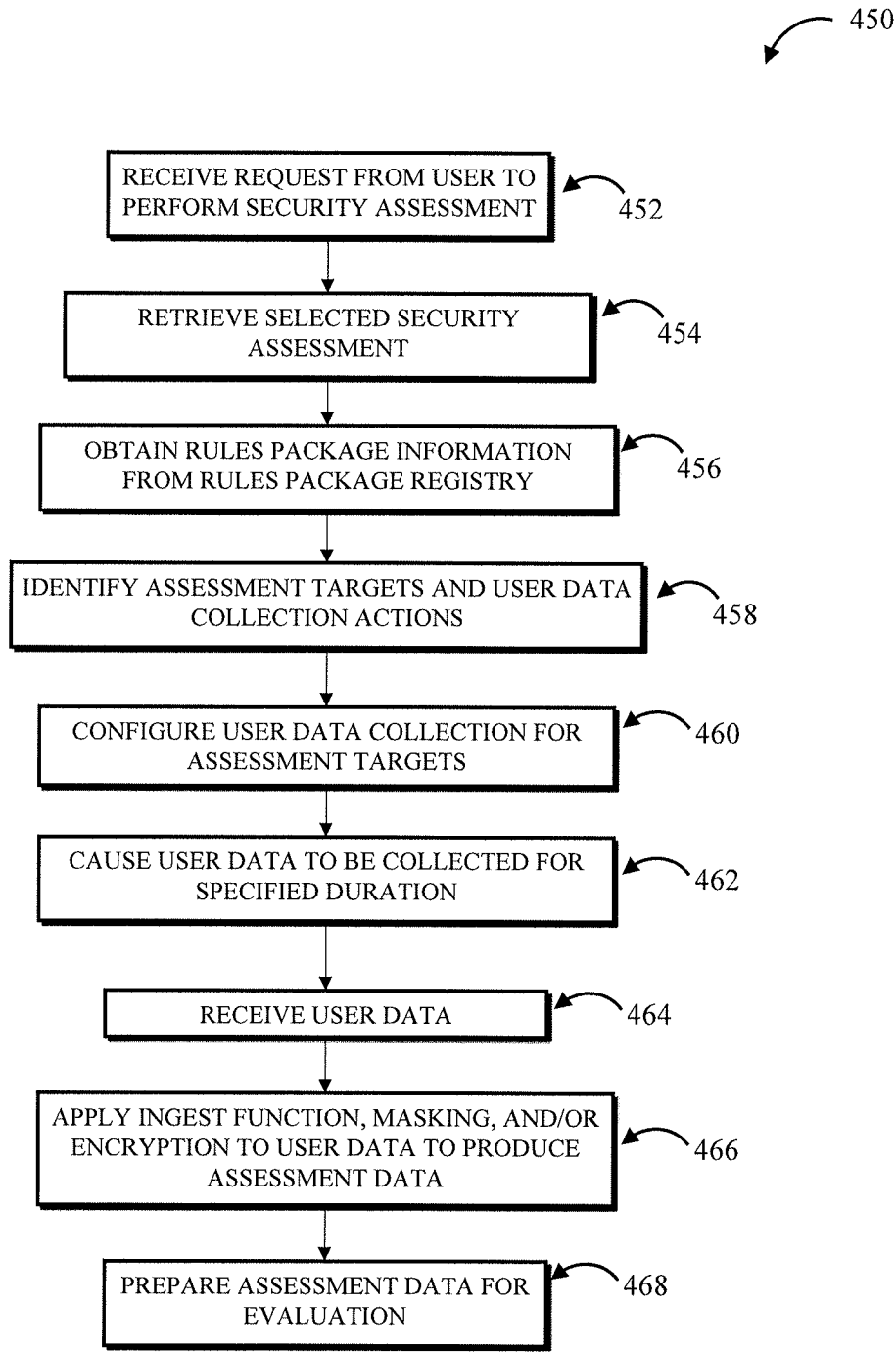
FIGS. 4B and 5B are flow diagrams of an example method for performing a customized security assessment that uses a customized rules package on assessment targets, in accordance with the present disclosure.

FIG. 4B illustrates an example method 450 of deploying a security assessment using the system of FIG. 4A. At 452, the system may receive a request (i.e., the deployment command) from the user device, and at 454 may retrieve the security assessment identified in (or identifiable from) the request. At 456, the system may obtain the rules package information needed to configure the data collection. For example, this information may include information identifying the sensors needed to obtain the desired sensor results, and may also include the location of the rules package even though that information may not be needed until the data evaluation is performed. At 458, the system may identify the assessment targets, which may be computing resources associated with the user's virtual computing environment. The system may further identify the data collection actions to be performed. In some embodiments, the sensor can be downloaded to the virtual computing environment, so it can collect the data. In some embodiments, the security assessment system may itself generate and/or collect the data by issuing commands to the virtual computing environment, to web service APIs offered by the service provider in order to collect data about an assessment target that is generated and made available by web services, or to the target computing resources themselves (e.g., directly or through an API of the virtual computing environment); thus, the system may read the manifest to determine which commands to issue. Alternatively, the system may identify the collection actions by identifying the sensors to activate and the input parameters to send to the sensors.

At 460, the system may configure the data collection process. For example, the system may send configuration commands to sensors, or to a security agent program, installed on the target computing resources or otherwise within the virtual computing environment, as explained in detail above. At 462, the system may activate the data collection, causing sensor results to be collected by the active sensors for the specified duration. At 464, the system may receive the generated sensor results, and at 466 the system may ingest the sensor results as described above, to produce assessment data that the customized rules packages are configured to access (and also that may be encrypted and/or anonymized). At 468, the system may prepare the assessment data for evaluation, such as by sending the assessment data to a scanning service or storing the assessment data temporarily in a data store.

Figure 5A:
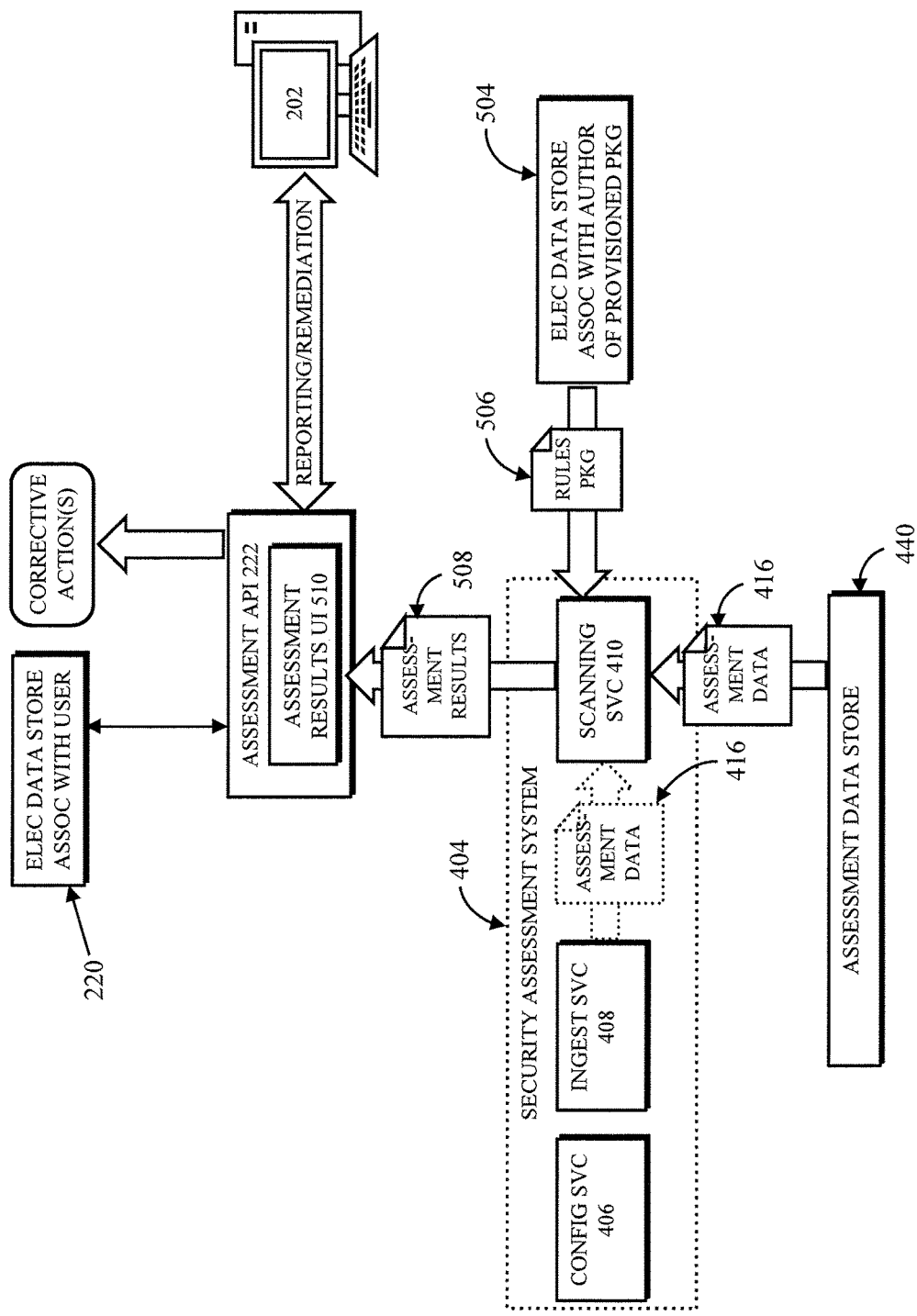

FIG. 5A illustrates an example data flow among system components of the computing environment 200, for performing the security assessment and delivering the results to various endpoints. The scanning service 410 receives the assessment data 416, either directly from the ingestion service 408 or by retrieving it from the assessment data store 440. In some embodiments, retrieving the assessment data 416 from the assessment data store 440 may include a command to delete the assessment data 416 from the assessment data store 440. Additionally or alternatively, the assessment data 416 may be stored in a record that is associated with a date/time of expiration, at which date/time the assessment data 416 will be deleted. The scanning service 410 may decrypt the assessment data 416 if it is encrypted.

In some embodiments, the rules package 506 for the security assessment may be stored in an electronic data store, such as a data store 504 associated with the author of the rules package 506. The scanning service 410 may be authorized to access the electronic data store 504; the scanning service 410 may locate (e.g., using the rules package location sent to the security assessment system 404, see FIG. 4A) the rules package 506 in the electronic data store 504 and may retrieve the rules package 506. The rules package 506 may include rules that are programmed to use the retrieval functions of the data objects contained in the assessment data 416. The scanning service 410 may execute the rules against the assessment data 416 to produce assessment results 508 as described above. The assessment results 508 may include data describing the outcomes of the security assessment, including the findings that describe identified security issues. In some embodiments, a "finding" may include "no problems found," and thus in the assessment results 508 there may be one finding for each of the rules. In other embodiments, a rule only reports a "finding" if the outcome indicates a security issue. The scanning service 508 may deliver the assessment results 508 to the assessment API 222.

In some embodiments, the assessment results 508 may include one or more reports that may be delivered directly to the user (e.g., via user device 202). In other embodiments, the assessment API 222 may be configured to translate the assessment results 508 into one or more reports. The reports may be delivered to the user device 202 via a GUI 510, which may enable the user to interact with the assessment results. For example, an interactive report may identify corrective actions that the system can perform with the user's authorization, and the user can select to approve or deny such corrective actions. Additionally or alternatively, the reports can identify corrective actions that the user must perform manually, and/or corrective actions that the system can perform automatically without user authorization. The reports and/or the assessment results 508 may be stored in the user's electronic data store 220 for keeping permanent or temporary records.

Figure 5B:
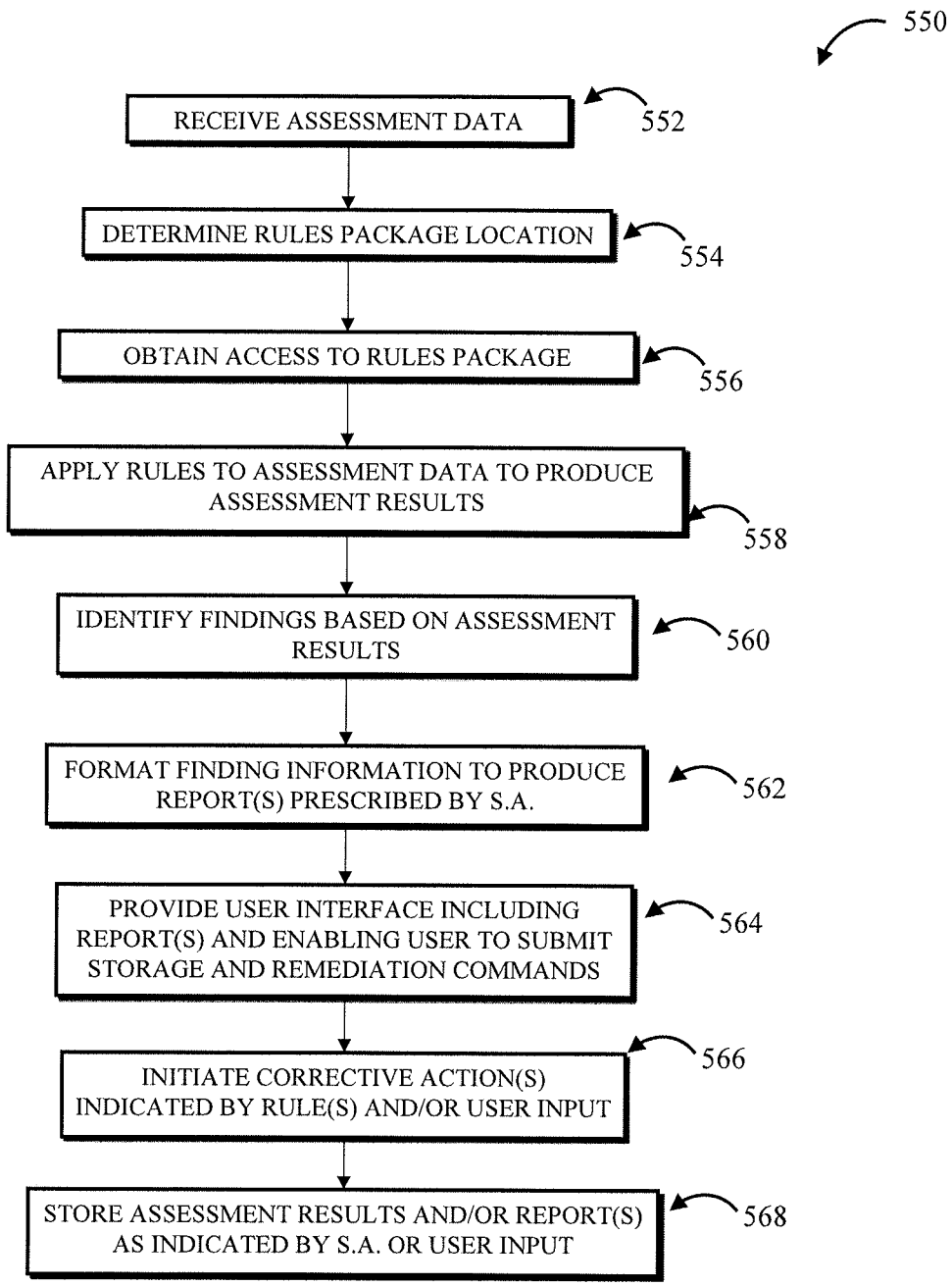

FIG. 5B illustrates an example method 550 of performing and reporting the security assessment in accordance with the system of FIG. 5A. At 552, the system may receive the assessment data, either directly once the assessment data is created, or by retrieving the assessment data from a storage location. At 554, the system may determine the location of the rules package(s) to be used; this information may be retrieved from the registry, for example. At 556, the system may obtain access to the rules package(s), such as by accessing the rules package location, or querying an electronic data store using the rules package ID and receiving the rules package. At 558, the system may apply the rules of the rules package(s) to the assessment data to produce the assessment results. In one embodiment, the system may be configured to execute the program code of the rules package, using the relevant parameter-value pairs stored in the assessment data as input parameters to the program code. The assessment results may include the outcomes of the rules' application, and at 560 the system may identify the corresponding findings indicated (e.g., in the rules package) as associated with the outcomes.

At 562, the system may use the identified findings and associated information, such as severity level, description of outcome, and options for remediation, to produce one or more reports of the assessment results that can be read by the associated user. The content and format of the report(s) may be included or referenced in configuration data for the security assessment. In one embodiment, the report specification may be available to the scanning service, so that the scanning service can generate the reports and send them to the assessment API. In another embodiment, the assessment results and findings may be received by the assessment API, which previously retrieved the security assessment, and the assessment API may generate the reports according to the specifications.

At 564, the system may provide a GUI to the user (e.g., via a connected user device), the GUI including the reports and/or the raw assessment results and findings. The GUI may display the report as an interactive report, whereby the user can provide input, such as a selection of remediation/corrective actions to perform. At 566, in response to such user input, or in response to a finding that provides an automated corrective action, the system may initiate the corrective action(s) indicated. At 568, the system may store the assessment results, the findings, and/or the reports together with metadata describing the security assessment performed. The storage location may be a data store of the user, a results data store that aggregates anonymized assessment results for analytical purposes, or another data store that is indicated by the security assessment or by user input.

Figure 6:
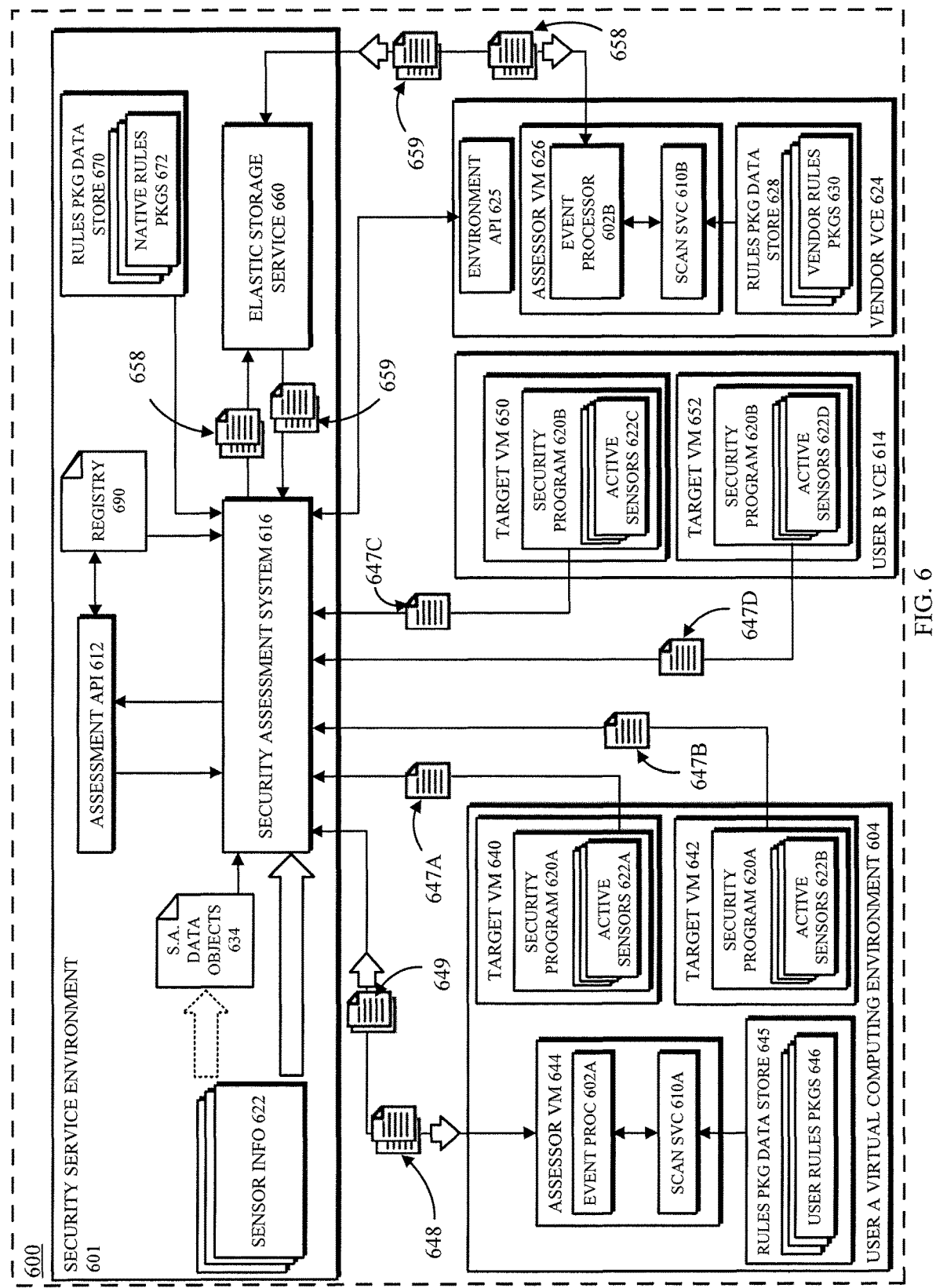
FIG. 6 is a diagram illustrating another example system for performing security assessments on user virtual computing environments using assessor virtual machines, in accordance with the present disclosure.

Referring to FIG. 6, embodiments of the present disclosure may operate within or upon a computing environment 600 of the computing resource service provider. Computing environment 600 may be implemented in the same manner as the example computing environments 100 and 200 described above; accordingly, computing resources, systems, and services described with respect to FIG. 6 may have the same or similar implementation details and perform the same or similar actions as their counterparts from previous figures, except where described. FIG. 6 generally illustrates a computing environment 600 in which, alternatively or in addition to the security assessment system 616 being able to execute rules packages against collected data (i.e., sensor results and/or assessment data) to produce assessment results (i.e., the "evaluation phase" of a security assessment) as described above, the evaluation phase may be performed within the user virtual computing environment 604 and/or within a vendor virtual computing environment 624. For example, an "assessor" virtual machine instance 644, 626 may launch within the corresponding virtual computing environment 604, 624, and may be configured to execute a rules package and produce assessment results as described below.

In some embodiments, a user (e.g., a customer) may be able to realize computational efficiencies in its security assessment runs by evaluating sensor results collected from target computing resources, such as one or more target virtual machines 640, 642, within the virtual computing environment 604 that is providing the target computing resources. This may be true for the user's own authored rules packages 646, as well as for native rules packages 672; therefore, native rules packages 672 that have been provisioned for the user may be sent, by the assessment API 612 or the security assessment system 616, to the virtual computing environment 604 and stored in a rules package data store 645 therein. This may affect the maintenance of the registry 690, wherein the entry for a native rules package 672 can include the storage location of the rules package; the location of the native rules package 672 would be different for some or all of the users who have requested it. One way to address this is to omit the storage location from the registry entry; the system could instead assume that the native rules package 672 is stored in the virtual computing environment 604 and that the assessor VM instance 644 knows where the package 672 is. Another way is to keep the native rules packages 672 stored in their own data store 670 within the security service environment 601. In other embodiments, the assessor VM instance 644 may be enabled to execute user rules packages 646, but native rules packages 672 may be executed by the security assessment system 616.

Similarly, in embodiments where aspects of the deployable sensors should remain hidden from rules packages of non-internal authors, sensor information 622 describing each of the native sensors (see sensor information 110 of FIGS. 1A-B) may remain in the security service environment 601 and may not be distributed to the virtual computing environments 604, 614, 624. Consequently, the security assessment system 616 may still perform the configuration and ingestion phases of the security assessment. In other embodiments, the security agent program 620A may be configured to generate sensor results (e.g., configuration and telemetry data) that can be evaluated by the assessor VM instance 644 without being sent to the security assessment system 616 for ingestion. In one embodiment, the security assessment system 616 may send the security assessment data object 634 structures (or one or more schema that enables the security agent program 620A to create the security assessment data objects 634 or to otherwise convert sensor results into assessment data) and the ingestion function to the security agent program 620A, and the security agent program 620A may be configured to use them to convert messages from its active sensors 622A,B into assessment data (i.e., containing data objects produced from the security assessment data object 634 structures) that the user rules packages 646 can evaluate. In another embodiment, the sensor information 622 itself may be changed so that the active sensors 622A,B produce messages that structure and store the sensor results in the structure or format designated by the corresponding security assessment data object 634. The resulting messages may thus be read directly by non-native rules packages (e.g., user rules packages 646, vendor rules packages 630). The sensor information 622 that is altered to produce "third-party-accessible" messages may be stored in the altered state, or the security assessment system 616 may retrieve the original sensor information 622, modify it accordingly, and send the modified sensor information to the security agent program 620A.

Yet another embodiment may use homomorphic encryption and computation to prevent the assessor VM instance 644 from discovering the format and content of sensor messages. In homomorphic encryption, encrypted data is operated upon without decrypting the data; the operations produce an encrypted result, which when decrypted proves to be the correct result of the computation that was intended on the original data. Thus, the party performing the operations never sees the plain-text data. In the present system, a homomorphic encryption scheme may be applied to encrypt the sensor results (e.g., each sensor message, all of the sensor messages produced by a sensor, or all of the sensor messages produced by all of the sensors), and the assessor VM instance 644 may be configured to apply the user rules package 646 to the encrypted sensor results to produce an encrypted finding. In any embodiment where the security agent program 620A produces assessment data that can be read directly by the assessor VM instance 644, the security agent program 620A may deliver the assessment data to the assessor VM instance 644 (e.g., via the event processor 602A) instead of sending the assessment data to the security assessment system 616.

In embodiments, including the FIG. 6 embodiment, where the security assessment system 616 performs the configuration and/or ingestion, one or more secure or encrypted (e.g., TLS encrypted) channels may be established between the security assessment system 616 and the virtual computing environment 604. For example, the security agent program 620A of each target virtual machine 640, 642 may send sensor results 647A,B generated during an assessment run to the security assessment system 616 on a TLS encrypted channel; there may be one commonly used channel or a separate channel for each instance of the security agent program 620A. The security assessment system 616 may have the same TLS encrypted channel, an additional TLS encrypted channel, or an unencrypted channel to communicate with the assessor VM instance 644. For example, a separate dedicated TLS encrypted channel may connect each VM instance 640, 642, 644 of a virtual computing environment 604 to the security assessment system 616. In one embodiment, a secure channel is established between the assessor VM instance 644 itself and the security assessment system 616, enabling the event processor 602A of the assessor VM instance 644 to exchange data with the security assessment system 616 as described herein.

A similar communication framework may be used to configure a security agent program 620B and its active sensors 622C,D in another user virtual computing environment 614 and to deliver sensor results 647C,D to the security assessment system 616. In some embodiments, the security assessment system 616 may receive data (e.g., sensor results 647C,D) directly from the instances of the security agent program 620B (e.g., via TLS encrypted channel as described above). This data communication framework is also similar to the configuration of FIG. 1A, although the security assessment system 616 may not perform the evaluation phase of the security assessment run on the target virtual machine instances 650, 652. Instead, when the assessment uses a vendor rules package 630, the evaluation is performed by an assessor VM instance 626 within the vendor's virtual computing environment 624. In some embodiments the security assessment system 616 may establish a data connection to the virtual computing environment 624 through an environment API 625. The environment API 625 may serve as a frontend of the virtual computing environment 624, receiving all communications from services and systems external to the virtual computing environment 624 and routing them to their destinations if the communications are authorized under the virtual computing environment's 624 security policies. In one example of establishing this connection, the user (i.e., vendor) to which the virtual computing environment 624 is allocated may assign, or authorize the assignment of, a security role to the security assessment system 616, enabling the security assessment system 616 to exchange messages and data with the event processor 602B of the assessor VM instance 626.

In some embodiments, the security assessment system 616 may deliver assessment data 658 and receive assessment results 659 through the environment API 625. Another approach for secure transfer of the data, which also has other benefits such as asynchronous transfer between the services, is to use an elastic storage service 660 to temporarily store the data. For example, the security assessment system 616 may create the assessment data 658 and send it to the elastic storage service 660 for storage; then, the security assessment system 616 may send the location of the assessment data 658 (e.g., via the environment API 625) to the event processor 602B of the assessor VM instance 626 in the vendor virtual computing environment 624. This alerts the assessor VM instance 626 that the assessment data 658 is ready. Subsequently, the event processor 602B or another service of the assessor VM instance 626 may access the location in the elastic storage service 660 and retrieve the assessment data 658 for evaluation. When the evaluation is complete, the event processor 602B or another service may send the assessment results 659 back to the elastic storage service 660, and may send the location of the assessment results 659 to the security assessment system 616. The security assessment system 616 retrieves the assessment results 659 and sends them to the assessment API 612 and/or to a data store.

The assessor VM instances 626, 644 for vendor or user environments may in some embodiments be launched from an assessor virtual machine image, and may therefore perform the same or substantially similar operations. Alternatively, an assessor VM for a user virtual computing environment may be configured differently from an assessor VM for a vendor virtual computing environment. For example, while a vendor may be able to create and modify its own assessor VM instance(s) (e.g., by maintaining a customized virtual machine image), the assessor VM image for a user may be provided by the computing resource service provider, and a user may be prevented (e.g., via application of a security policy) from accessing, viewing, and/or manipulating the assessor VM instance(s) executing in its virtual computing environment. Thus, the assessor VM instance 644 may be launched in the virtual computing environment 604 of the user by the security assessment system 616 itself; the user may be able to grant and revoke permissions for the security assessment system 616 to do this. In one embodiment, an event processor 602A,B may serve as a frontend service for its VM instance, receiving and acting on messages from other services within the virtual computing environment and/or from external services, and in some embodiments coordinating the execution of the scanning service 610A,B. For example, the event processor 602A,B may be able to launch and maintain container instances within the virtual machine, and to load data, such as a rule and/or a portion of the assessment data, into a container instance. Container instances in the assessor VM may be configured to implement the scanning service 610A,B as described below.

In various embodiments, the scanning service 610A,B may be a service, a program, or a software package installed on the assessor VM instance. The scanning service 610A,B may receive assessment data and rules packages and execute the rules packages against the assessment data to produce the assessment results. In one embodiment, this may be performed as described previously with respect to the scanning service 410 in FIG. 5A. That is, the scanning service 610B, for example, may receive (e.g., from the event processor 602B) a request to evaluate the assessment data 658 stored at the received location, using a rules package 630 stored in the rules package data store 628; the scanning service 610B may retrieve the assessment data 658 from the storage location, retrieve the rules package 630 from the data store 628, and execute the rules of the rules package 630 against the assessment data 658, producing the assessment results 659. Additional embodiments and implementations are described below.

Figure 7:
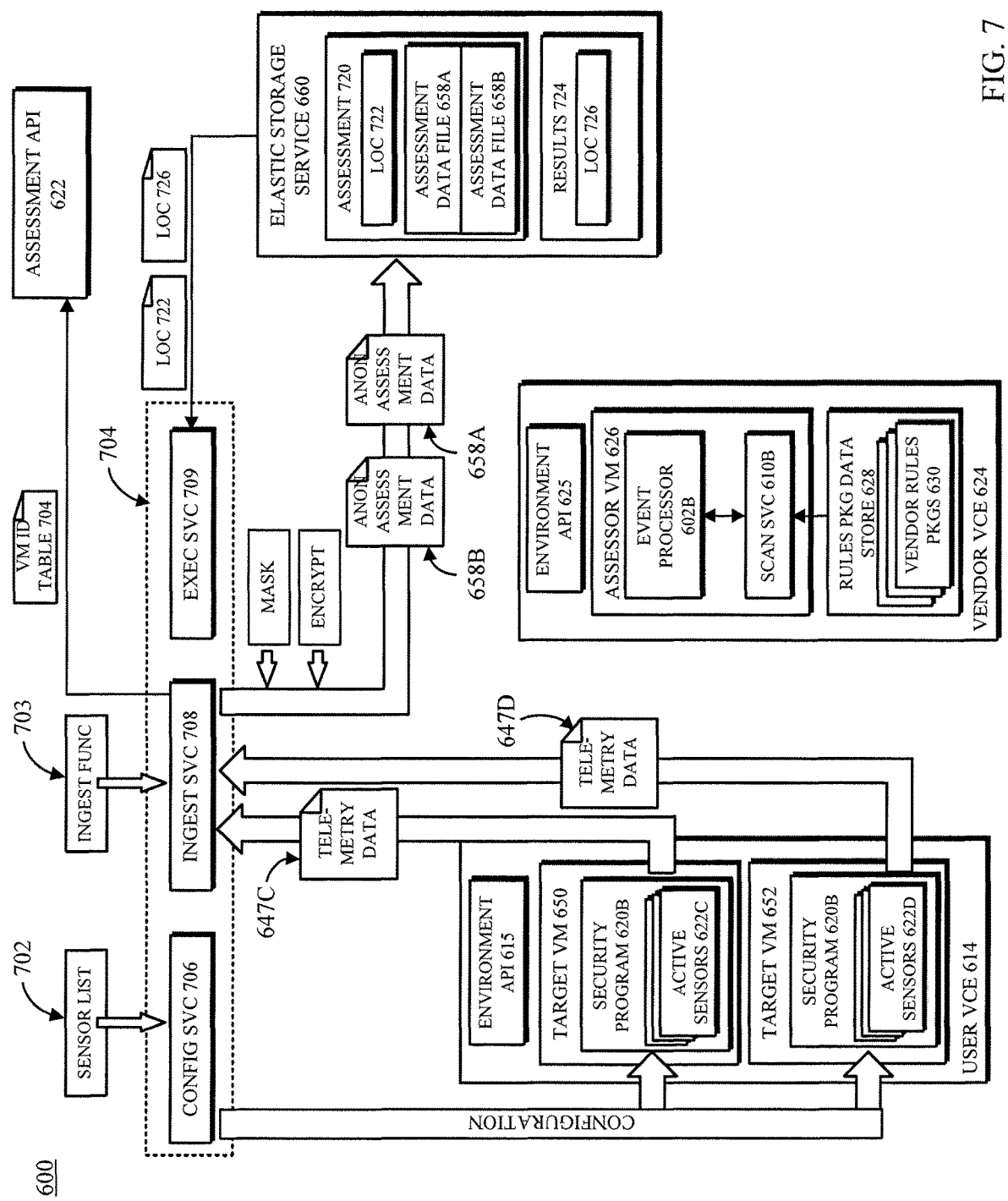
FIGS. 7 and 8 are diagrams of an example data flow within a system for performing, by an assessor virtual machine within a vendor's virtual computing environment, a customized security assessment that uses a customized rules package on computing resources within a user's virtual computing environment, in accordance with the present disclosure.

FIG. 7 illustrates an example data flow among components of the computing environment 600, according to FIG. 6, for performing the configuration and ingestion phases of a security assessment on target virtual machines 650, 652 of a user's virtual computing environment 614, where the evaluation phase is performed within a vendor's computing environment (e.g., virtual computing environment 624). The provisioning and deployment of the security assessment and rules package(s) may have been performed as described previously, such that information including a sensor list 702 with input parameters, and an ingest function 703 for the necessary security assessment data objects, arrive at the security assessment system 704 for use by a configuration service 706 and an ingestion service 708, respectively. The configuration of the security agent program 620B instances and the active sensors 622C,D proceeds as described above with respect to FIG. 4A. Also, the security agent program 620B instances generate sensor results 647C,D in accordance with the sensor configuration, for the prescribed duration, and send the sensor results 647C,D to the security assessment system 704 as described previously. The ingestion service 708 also operates as described above with respect to the ingestion service 408 of FIG. 4A. Notably, these operations of FIG. 7 are conducted in substantially the same manner when the assessor VM instance is executing in the user virtual computing environment, as illustrated in FIG. 6.

The ingestion service 708, after applying the ingestion function 703 to the sensor results 647C,D to produce assessment data, may mask (and/or encrypt) certain information in the assessment data to produce anonymized assessment data 658A,B. For example, and anonymization protocol may be applied to mask or remove information that identifies the user account or the target computing resources. However, in some embodiments the system may later need to know which assessment results apply to which target VM instance 650, 652. The ingestion service 708 may copy the target VM instance 650, 652 identifiers into a VM identifier table 704; then, the ingestion service 708 may generate opaque (e.g., random) identifiers for the target VM instances 650, 652, associate them in the VM identifier table 704 with the actual identifiers, and replace the actual identifiers in the assessment data with the opaque identifiers. The VM identifier table 704 may, for example, be sent to the assessment API 622 or to the execution service 709 to enable matching of the anonymized assessment results to the target VM instances 650, 652. The ingestion service 708 may also encrypt the anonymized assessment data 658A,B to further protect it. In one embodiment, the system may implement a homomorphic encryption algorithm to encrypt the assessment data, so that the assessment data may be evaluated by the vendor virtual computing environment 624 without being exposed to the virtual computing environment 624.

FIG. 7 clarifies an embodiment in which the sensor results 647C of a first target VM instance 650, and the assessment data 658A produced therefrom, may need to be distinguished from any other target of the security assessment (i.e., target VM instance 652 and its sensor results 647D and assessment data 658B), so that the assessment results can be matched to the corresponding target. Thus, when the assessment data 658A,B is sent to the elastic storage service 660 for storage in a temporary data store 720 for the assessment data, the corresponding assessment data 658A,B for each target may be stored separately, such as in separate data files. It may be particularly advantageous to keep the assessment data of different targets clearly separate in the present embodiment, due to the anonymization of the assessment data 658A,B.

In one embodiment of sending the assessment data 658A,B to the elastic storage service 660, the security assessment system 704 may request security measures such as a unique temporary storage location that is accessible by the vendor virtual computing environment 624 services (i.e., the event processor 602B and/or the scanning service 610B). Another example security measure is for the elastic storage service 660 to prevent a requestor from accessing the stored files unless the requestor has the unique location and/or the same security permissions as the security assessment system 704. The security assessment system 704 may receive the requested location 722 of the assessment data 658A,B. In one example, the location 722 is a complex URL. Additionally, the security assessment service 704 may obtain a second unique temporary storage location 726 in a data store 724 where the assessment results will be stored.

Figure 8:
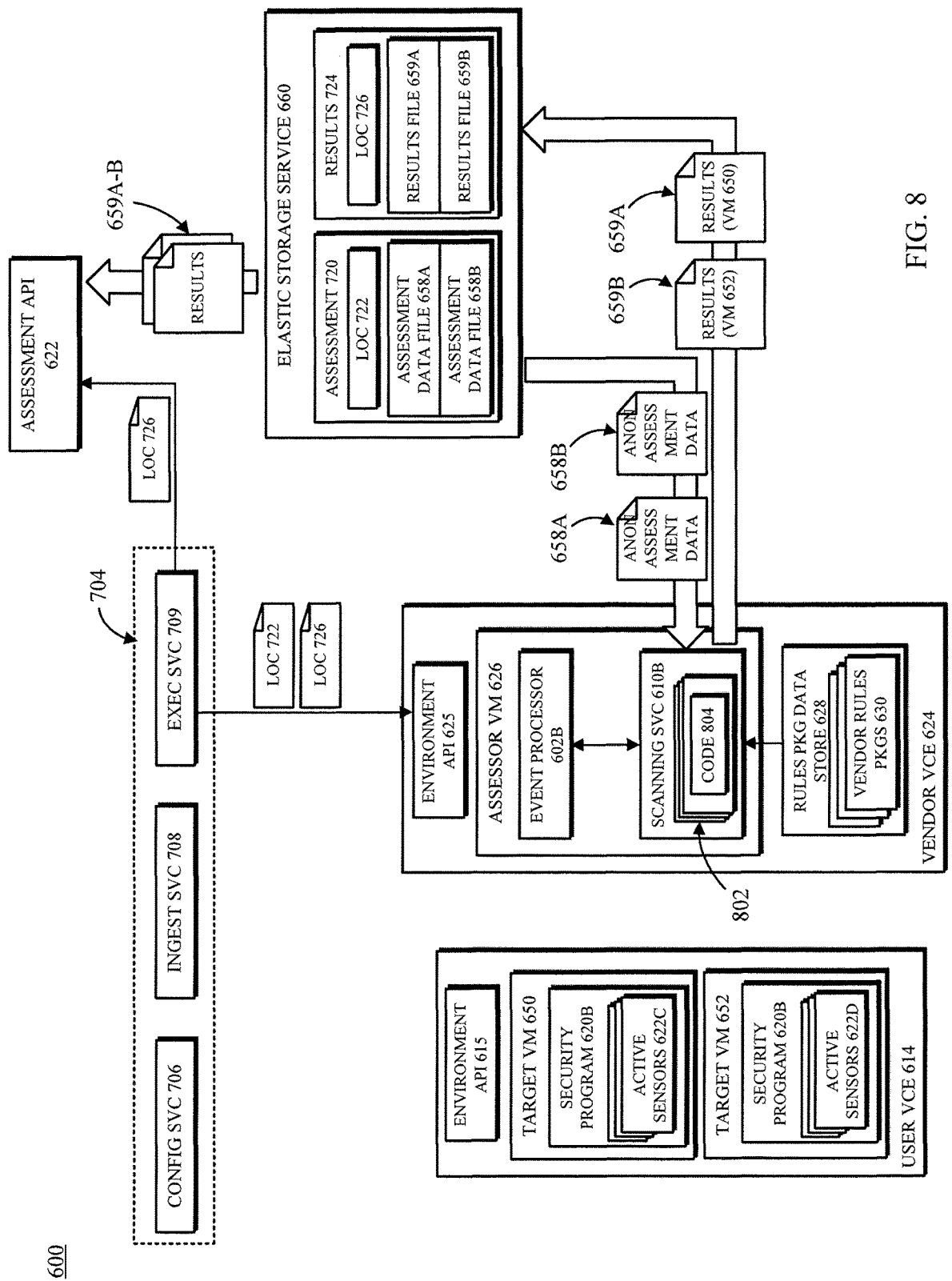

FIG. 8 illustrates an example data flow between components of the computing environment 600, in accordance with FIG. 6, for performing the evaluation phase of a security assessment within a vendor's virtual computing environment 624. Because the scanning service operations are performed outside of the security assessment system 704, the security assessment system 704 may include an execution service 709 in place of the scanning service. The execution service 709 may send the first location 722 of the assessment data 658A,B to the vendor virtual computing environment 624. The execution service 709 may also send the second location 726 of the data store for storing the assessment results 659A,B to the vendor virtual computing environment 624. The event processor 602B or scanning service 610B may use the first location 722 to obtain the assessment data 658A,B, such as by visiting the URL and downloading the objects. After evaluating the assessment data 658A,B to produce the assessment results 659A,B, the event processor 602B or scanning service 610B may send the assessment results 659A,B to the elastic storage service 660 for storage; the event processor 602B or the elastic storage service 660 may send a message to the execution service 709 and/or the assessment API 622 when the assessment results 659A,B have been uploaded. In one embodiment, illustrated in FIG. 7, the event processor 602B or scanning service 610B may use the second location 726 initialized by the security assessment system 704 to upload the assessment results 659A,B to the elastic storage service 660. In another embodiment, the results data store 724 may not be pre-initialized by the security assessment system 704, and the event processor 602B or scanning service 610B may request the temporary, secure storage location 726 from the elastic storage service 660 upon sending the assessment results 659A,B for storage. The event processor 602B may then send the second location 726 to the assessment API 622 directly or via the execution service 709. The assessment API 622 may use the second location 726 to retrieve the assessment results 659A,B.

As stated above, one embodiment of the scanning service 610B is a program or software package that executes the rules substantially serially. In another embodiment, each rule of the rules package may have program code that can be executed independently of the program code of the other rules. Additionally, the program code of a rule may comprise multiple functions, some of which appear in the program code of other rules. These features are conducive to provisioning a plurality of isolated computing environments (i.e., containers) that can be rapidly deployed and reused, so that processing of the rules can be distributed and run in parallel. The scanning service 610B may be implemented by, or may use, one or more container instances 802 launched from a software container image that is configured to provide a computing environment for executing at least one of the rules and/or functions that make up the rules. For example, a rule for processing all "process_launch" data objects in the assessment data may comprise three discrete functions: an initiate function that receives the "process_launch" data objects and calls an instance of the "evaluate" function for every data object; an evaluate function that receives a "process_launch" data object, calls the data object's retrieval methods to access the parameter-value pairs, performs some evaluation of the retrieved values, passes the results to an instance of the "finish" function, and exits; and, a finish function that receives evaluation results, determines the outcome of the evaluation, and identifies the finding associated with the outcome. Each of these functions may execute within its own container instance; additionally, multiple instances of each function may be executed simultaneously, so that the scanning service 610A,B can evaluate dozens of "process_launch" data objects at once.

In some embodiments, the event processor 602B or the scanning service 610B may obtain both the assessment data and the rules package, and may be configured to extract each rule and launch one or more container instances to execute the rule(s). For example, the scanning service 610B may send a request for a container instance to the event processor 602B and the event processor 602B may launch a new container instance from the software container image and load rule or function code 804 into it. Additionally, the event processor 602B may monitor the status of the executing container instances, and may reuse an idle container instance by loading code 804 of another function (or another instance of the same function) into it. The rules may generate the assessment results as they are executed, and may store the results (e.g., in a data store or in a logical volume mounted to the assessor VM instance) or may return the results to the scanning service 610B. When the rules have finished executing, the event processor 602B may terminate any remaining container instances and the assessment results may be sent back to the security assessment system 704 or to the elastic storage service 660.

Figure 9:
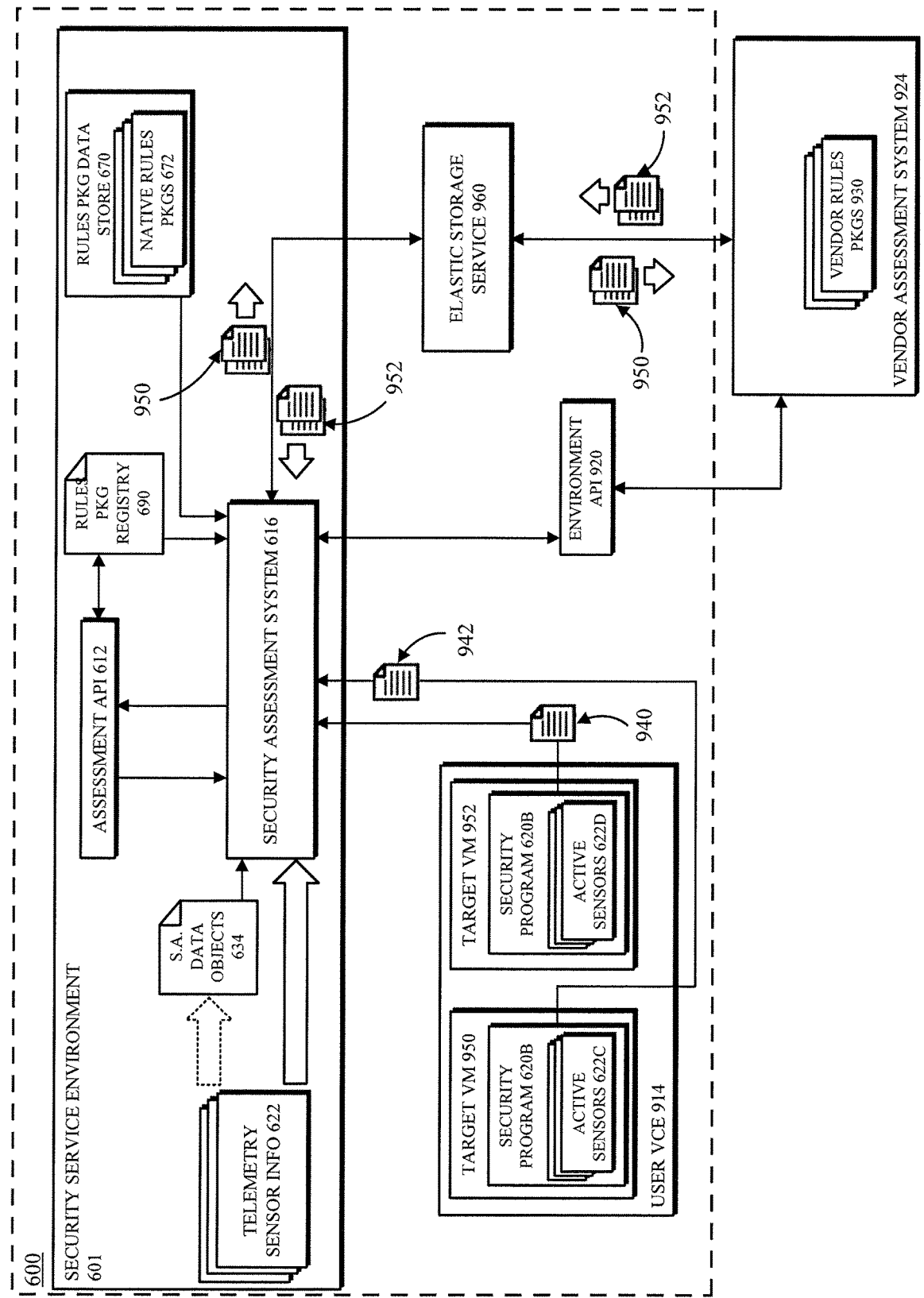
FIG. 9 is a diagram illustrating another example system for performing security assessments on user virtual computing environments using an assessment system that is external to the computing resource service provider, in accordance with the present disclosure.

FIG. 9 illustrates the computing environment 600 of FIG. 6 with some additional components for facilitating a use case in which assessment data 950 is evaluated in a vendor's computing environment that is outside of the computing environment 600, such as within a vendor assessment system 924. In embodiments of the illustrated system, target virtual machine instances 950, 952 in a user virtual computing environment 914 are monitored by the security agent program 620B, and sensor results 940, 942 is sent to the security assessment system 616 as described above with respect to various embodiments. Additionally, the assessment data 950 is anonymized and encrypted and sent to an elastic storage service 960 as described above; the security assessment system 616 and the vendor assessment system 924 may exchange messages, such as the locations of data in the elastic storage service 960, via an environment API 920. The vendor assessment system 924 may store the vendor rules packages 930; the system 924 may retrieve the assessment data 950 from the elastic storage service 960 (e.g., using a secure URL) and execute the rules against it to produce the assessment results 952, which the system 924 may deliver to the security assessment system 616 via the elastic storage service 960 using any of the embodiments described above.

Figure 10:
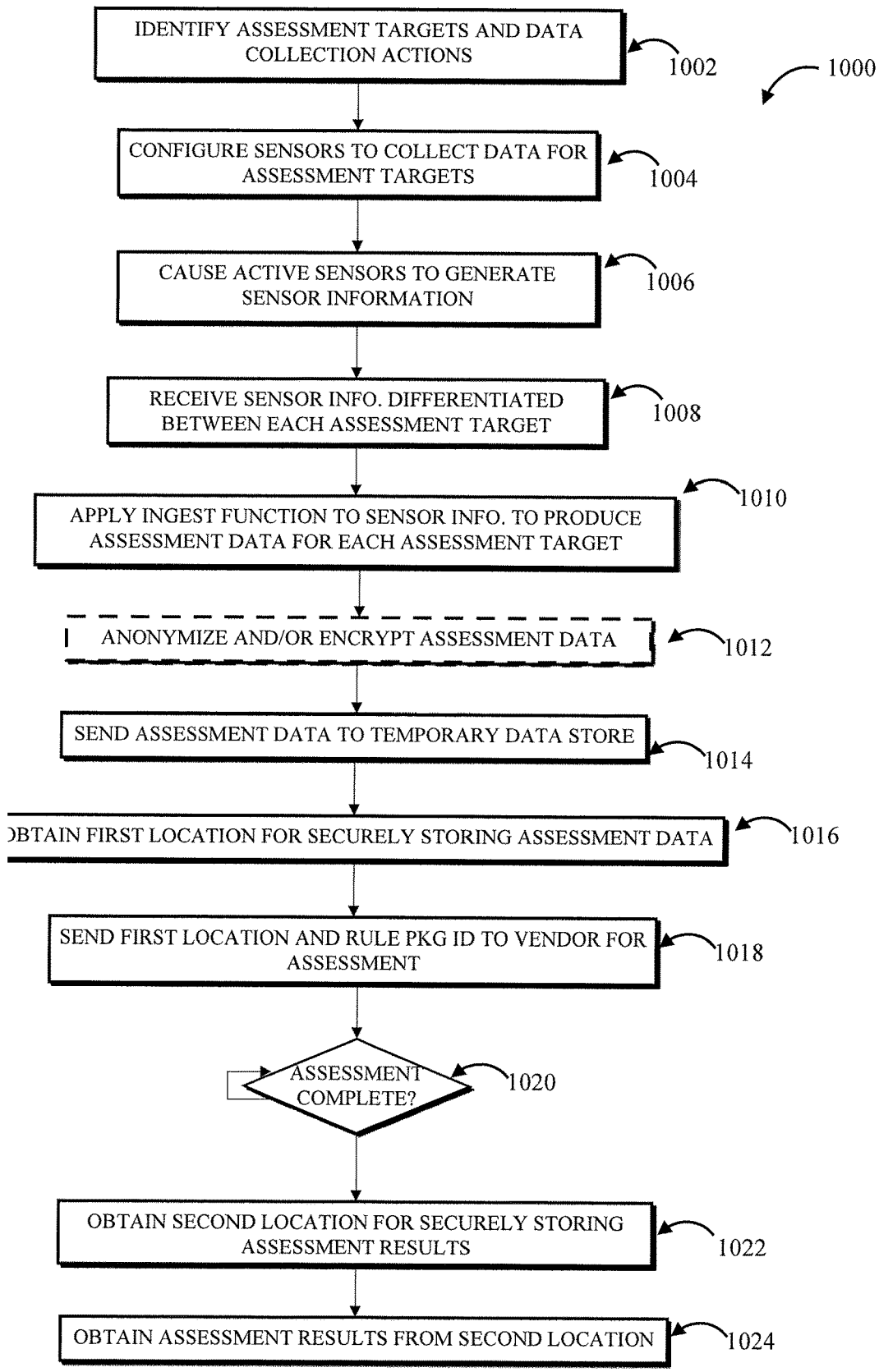
FIG. 10 is a flow diagram of another example method for performing a customized security assessment that uses a customized rules package on assessment targets, in accordance with the present disclosure.

FIG. 10 illustrates an example method 1000 for performing a security assessment in any of the system embodiments described above with respect to FIGS. 6-9 (i.e., when the rules package is executed within a virtual computing environment instead of by the security assessment system). At 1002, the system may identify the assessment targets and the actions to be performed to collect sensor results from the targets. At 1004, the system may configure the collection of sensor results, such as by activating the appropriate sensors. At 1006, the system may initiate the sensor results collection, receiving the sensor results at 1008. At 1010, the system may ingest the sensor results, converting it into assessment data that corresponds to the preconfigured security assessment data objects. Examples of these steps are further noted above.

At 1012, the system may anonymize and/or encrypt the assessment data. This step may be designated as optional, depending on the permissions and other security characteristics of the entity controlling the assessment. For example when the assessment is being performed between the security assessment system and the user's virtual computing environment, there may be no risk of exfiltration of data and so encryption/anonymization is not needed. In another example, when the assessment data is being sent out of the computing environment to a vendor's assessment system, the assessment data may be anonymized/encrypted for customers that have not granted permissions to the vendor to analyze sensitive data, and this step may be omitted for customers that elect to grant the vendor access to the sensitive data. At 1014, the system may send the assessment data to a temporary data store, such as one maintained by an elastic storage service a database service, or a data storage service, and at 1016 the system may obtain a location of the stored assessment data. The location may, for example, be a "pre-signed" URL indicating that authorized requestors having the URL can retrieve the stored data files, an identifier for a storage location, or a database identifier that can be used to perform a database look-up on the assessment data. At 1018, the system may send the received location and the rule package identifier to the receiver (e.g., the vendor's system or computing environment). The system may receive an acknowledgement from the vendor's system; in some embodiments, the acknowledgement may include an identifier of the assessment underway in the vendor's system.

In some embodiments, the system may receive a notification from the vendor when the assessment is complete (step 1022). In other embodiments, the vendor may not be authorized to send unsolicited messages, and so at 1020 the system may periodically check whether the assessment is complete. For example, the system may send a status request to the vendor's system (e.g., via the environment API), using the vendor's identifier for the assessment. If the assessment is not complete, the system may receive an appropriate message and continue waiting. If the assessment is complete, the response from the vendor may include a second location that the system receives at 1022. The second location is the location of the assessment results, and may for example be a pre-signed URL; at 1024, the system may access the second location and retrieve the assessment results.

Figure 11:
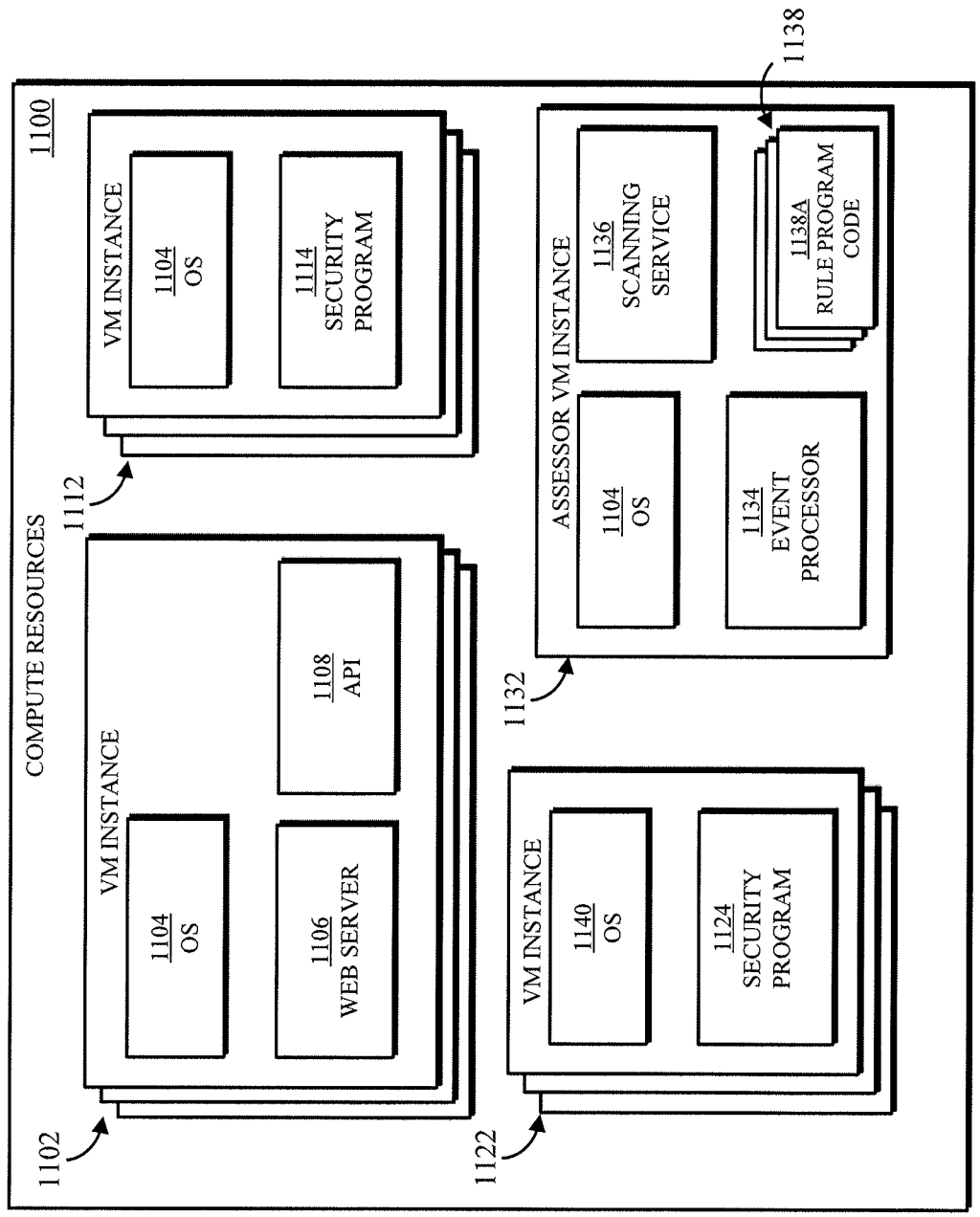
FIG. 11 is a diagram of an example of compute resources that can be used to implement one or more portions of systems such as those shown in FIGS. 1A, 6, and 9, in accordance with the present disclosure.

FIG. 11 shows an example of a portion of compute resources 1100 that can be used to implement one or more portions of the above-described systems. In some embodiments, virtual machine instances deployed in compute resources 1100 can be provided through a compute service that provides access to virtual machines that can launch and execute a variety of applications from software images. For example, in some embodiments, compute resources 1100 can include any suitable number of virtual machines, such as virtual machine instances 1102, 1112, 1122, and 1132. In some embodiments, a "virtual machine instance" can refer to a specific allocation of virtual computing resources that has the properties of a particular virtual machine (VM) and is configured to launch and run software. For example, a virtual machine instance can be launched from a virtual machine image, which can, for example, represent the entire state of a virtual machine instance at the time it was imaged, such that a virtual machine instance and any software applications installed on the virtual machine instance can be restored to that point by restoring/launching the virtual machine image. As another example, software can be launched by a virtual machine using one or more software images, which can, for example, represent the entire state of a software application at the time it was imaged, such that the software application can be restored to this point by restoring/launching the software image. In some embodiments, virtual machine instance 1102 can execute software to provide functionality of a web server 1106 based on a virtual machine image and/or one or more software images provided by a user of the virtual machine instance (e.g., a service provider associated with the security assessment system).

VM instances can have an operating system (OS) 1104, 1140, software 1106 for providing web server functionality, and software 1108 for providing one or more APIs that can be exposed to users of the security assessment system. For example, VM instances 1102 can receive requests, from users or other services/resources, that are evaluated using API 1108. In such an example, API 1108 can evaluate the API call, and based on the contents of the API call, can perform other actions such as providing a GUI, retrieving data from a data store, and the like.

In some embodiments, VM instance 1112 can have software 1114 for providing a security agent program as described above. VM instance 1122 can have a different OS 1140, and software 1124 for providing a security agent program that performs the same operations as that of software 1114, but is compatible with the OS 1140. VM instance 1132 can have OS 1104, software 1134 for providing an application that processes incoming and internal events, and software 1136 for providing a scanning service that evaluates rules packages 1138, which may also be stored on the VM instance 1132. The rules packages 1138 may be files stored in a file system of the VM instance 1132, or of a logical volume mounted to the VM instance 1132. The rules packages 1138 may include program code 1138A that the VM instance 1132 uses the software 1136 to execute.

Note that although FIG. 11 is described in connection with a compute service, a network-accessible services system can be provided using a similar configuration of hardware and software devices. For example, a network-accessible services system can be used to run various program codes on-demand using virtual computing resources provided by compute resources 1100. In a more particular example, a computing resource service provider can configure the network-accessible services system to receive requests to execute program codes from a user without requiring that the user configure a particular virtual machine instance, one or more containers executed by the virtual machine instance, etc. In some embodiments, the network-accessible services system can receive the code to be executed (and/or identifying information of code to be executed), information to be used in executing the code, etc., can assign a VM instance to execute the code, and in some cases, provide output that is generated during execution of the code. In some embodiments, VM instances of a network-accessible services system may not be associated with a particular user, but may instead be used by many different users (simultaneously and/or serially) to execute program codes. In some embodiments, a network-accessible services system can be used to provide any suitable functionality described herein (e.g., evaluating assessment data).

Figure 12:
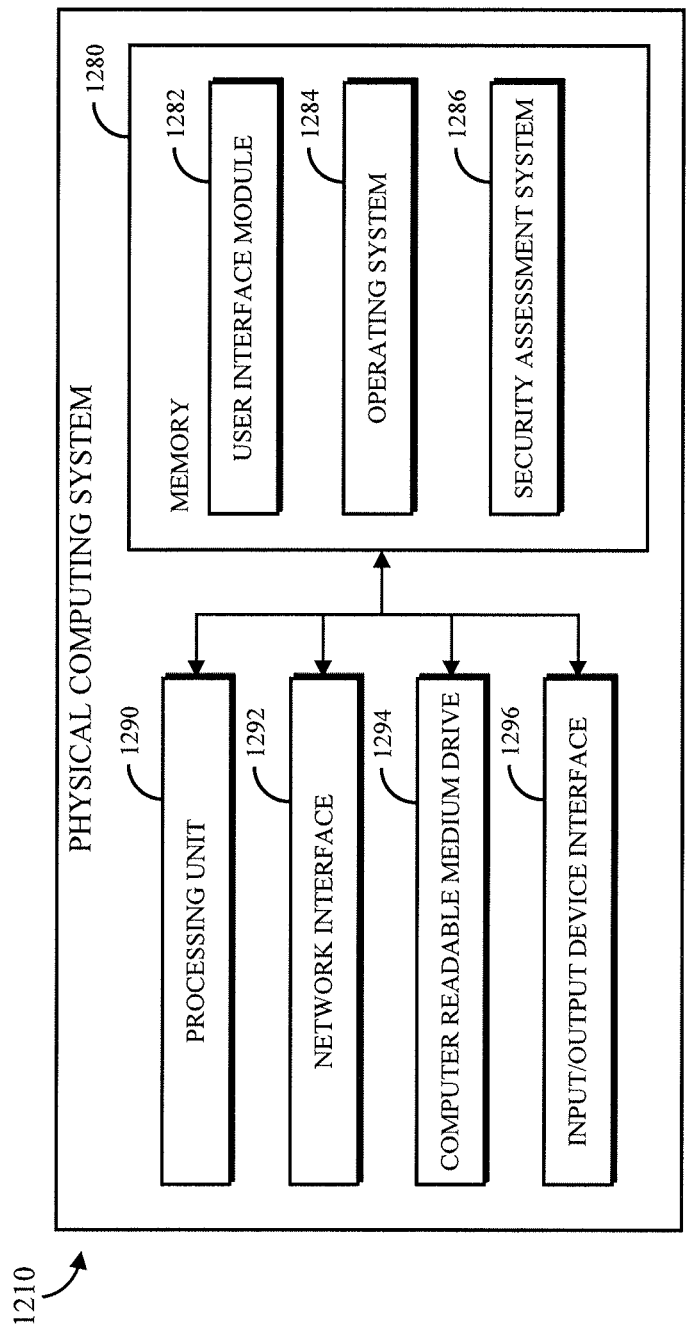
FIG. 12 is a diagram of an example general architecture of a computing system that performs security assessments in accordance with the present disclosure.

FIG. 12 shows an example of a general architecture of a physical computing device 1210 (e.g., a server, such as server computer 142 of FIG. 1A) that can be used to provide access to at least a portion of the mechanisms described herein, in accordance with some embodiments of the disclosed subject matter. The general architecture of physical computing device 1210 depicted in FIG. 12 includes an arrangement of computer hardware and/or software modules that can be used to implement aspects of the disclosed subject matter. The hardware modules may be implemented with physical electronic devices, as described below, and physical computing device 1210 can include many more (or fewer) elements than those shown in FIG. 12. It is not necessary, however, that all of these generally conventional elements be shown in order to provide an enabling disclosure. Additionally, the general architecture illustrated in FIG. 12 may be used to implement one or more of the other components illustrated in FIGS. 1A, 6, and 9, for example. As illustrated, physical computing device 1210 includes a processing unit 1290, a network interface 1292, a computer readable medium drive 1294, and an input/output device interface 1296, all of which can communicate with one another by way of a communication bus. Network interface 1292 can provide connectivity to one or more networks or computing systems. The processing unit 1290 can thus receive information and instructions from other computing systems or services via communication network 106. Processing unit 1290 can also communicate to and from memory 1280 and further provide output information for an optional display (not shown) via the input/output device interface 1296. The input/output device interface 1296 can also accept input from one or more optional input device (not shown).

Memory 1280 can contain computer program instructions (e.g., grouped as modules in some embodiments) that processing unit 1290 executes in order to implement one or more aspects of the disclosed subject matter. In some embodiments, memory 1280 can include RAM, ROM, EEPROM, one or more flash drives, one or more hard disks, one or more solid state drives, one or more optical drives, etc., any other suitable persistent, auxiliary, or non-transitory computer-readable media, or any suitable combination thereof. Memory 1280 can store an operating system 1284 that provides computer program instructions for use by processing unit 1290. Memory 1280 can further include computer program instructions and other information for implementing aspects of the disclosed subject matter. For example, in some embodiments, memory 1280 can include a user interface module 1282 that generates user interfaces (and/or instructions therefor) for display upon a computing device, e.g., via a navigation and/or browsing interface such as a browser or application installed on the computing device. In addition, memory 1280 can include and/or communicate with one or more data repositories (not shown), for example, to retrieve threat information, subscription information, program codes, libraries, etc.

In some embodiments, memory 1280 can include a security assessment system 1286 that may be executed by processing unit 1290 to provide at least a portion of the services described above. For example, in some embodiments, physical computing device 1210 can execute a virtual machine instance that can use security assessment system 1286 to implement at least a portion of the security service environment. In some embodiments, the virtual computing environments and the components of the computing environments 100, 200, 600, may be implemented using any suitable number of physical computing devices (e.g., physical computing device 1210) in any suitable locations.

Thus, in one aspect, the present disclosure provides a system that includes: an electronic data store storing data describing a plurality of security assessments, each security assessment associated with a rules package including a plurality of rules used to evaluate assessment data to produce findings associated with security vulnerabilities; and, one or more hardware computing devices in communication with the electronic data store and configured to execute specific computer-executable instructions. The instructions, upon execution, cause the system to: receive, from a user computing device in communication with the one or more hardware computing devices, a request to select a first security assessment from the plurality of security assessments, the first security assessment associated with a first rules package and with a first sensor that produces sensor results describing an associated virtual machine instance; in response to the request, cause the first rules package to be associated with a user account associated with the user computing device; and in response to a request to perform a security assessment using the first security assessment on a virtual machine associated with the user account, configure an instance of the first sensor to generate first sensor results for the virtual machine, and cause a scanning service to convert the first sensor results into first assessment data and determine, based at least in part on the first rules package evaluating the first assessment data, an assessment finding for the virtual machine.

The electronic data store may further store a security assessment configuration associated with the first security assessment. Executing the specific computer-executable instructions further causes the one or more hardware computing devices to: further in response to the selection of the first security assessment, create a security assessment record associated with the user account and containing the security assessment configuration; configure the first sensor based at least in part on the security assessment configuration; and associate the assessment finding with the user account using the security assessment configuration. The first rules package may be prevented from directly evaluating sensor results of a plurality of sensors associated with a computing resource service provider, the plurality of sensors including the first sensor and the sensor results including the first sensor results. The electronic data store associates the first security assessment with the first rules package data in a first security assessment record, and further stores a second security assessment record associating a second security assessment, of the plurality of security assessments, with a second rules package that is enabled to directly evaluate the sensor results of the plurality of sensors. The request to select the first security assessment may be associated with an interface provided to the user device and representing an electronic marketplace within which the first security assessment and the second security assessment are selectable.

In another aspect, the present disclosure provides a system including one or more hardware computing devices configured to execute specific computer-executable instructions that upon execution cause the system to: receive, from a user computing device, user input comprising a selection of a first security assessment from a plurality of security assessments selectable in an electronic marketplace, the first security assessment invoking a first rules package comprising a plurality of first rules that operate on assessment data to evaluate a first set of the one or more security characteristics; and, cause the first rules package to be associated with the user account such that the user is enabled to cause an instance of a first sensor to produce first sensor results describing a computing resource associated with the user, and to request that an instance of the first security assessment be performed on the computing resource.

The first rules package may be prevented from accessing the first sensor results, and the instance of the first security assessment causes a security assessment system to receive the first sensor results and to produce the assessment data from the first sensor results. The first sensor results may include a plurality of data elements, the assessment data may have a first format on which the plurality of rules are configured to operate, and the first format may exclude one or more of the plurality of data elements from the assessment data. The assessment data may include one or more data elements copied from the first sensor results, and the plurality of rules of the first rules package may be configured to access the assessment data to obtain the one or more data elements.

Executing the specific computer-executable instructions may further cause the system to, in response to receiving the user input, cause a security assessment configuration of the first security assessment to be associated with the user account, such that the user in enabled to configure, by editing the security assessment configuration, the instance of the first security assessment. Executing the specific computer-executable instructions may further cause the system to: receive first rules package data describing the first rules package; and associate the first rules package with a vendor account associated with a provider of the first rules package to the system. Executing the specific computer-executable instructions further causes the system to: receive a first security assessment configuration associated with the first security assessment; associate the first security assessment configuration with the vendor account; and, in response to receiving the user input, cause the first security assessment configuration to be associated with the user account, such that the user is enabled to configure the instance of the first security assessment of the computing resource. Executing the specific computer-executable instructions may further cause the system to, in response to receiving the user input, cause a rules package registry to be updated to include information indicating that the first rules package is associated with the user account, the rules package registry associating the first rules package with the vendor account. Executing the specific computer-executable instructions may further cause the system to: obtain, from a rules package registry comprising a first record associating the vendor account with the first rules package, user feedback information describing a reputation score of the provider; and include the reputation score in the second descriptive information.

Executing the specific computer-executable instructions may further cause the system to: receive first rules package data describing the first rules package and including a visibility indicator having a first value that indicates the first rules package can be made available in an electronic marketplace; receive second rules package data describing a second rules package created by a second user; determine that the second rules package data includes the visibility indicator having a second value that indicates the second rules package cannot be made available in the electronic marketplace; and, exclude from the plurality of security assessments any private security assessment that uses the second rules package. Instances of the plurality of security assessments operate within a computing environment of a computing resource service provider, the first security assessment is created by an author other than the computing resource service provider, and a second security assessment of the plurality of security assessments is created by the computing resource service provider.

In yet another aspect, the present disclosure provides a method including the steps of: receiving, from a requesting device, a request to provision a security assessment within a computing environment of a computing resource service provider, wherein the security assessment causes one or more sensors of the computing environment to produce sensor results describing activity of a target computing resource within the computing environment, and invokes one or more rules packages comprising a plurality of rules that identify security vulnerabilities of the target computing resource; providing to the requesting device a user interface that enables a user of the user computing device to select any of a plurality of available rules packages; receiving, via the user interface, user input comprising a selection of a first rules package comprising a plurality of first rules that operate on assessment data to identify the security vulnerabilities, wherein the first rules package cannot operate on the sensor results; and, associating the first rules package with a user account to enable a user associated with the user account to launch an instance of a first security assessment on a computing resource associated with the user, the first security assessment invoking the first rules package and causing a security assessment system of the computing environment to receive the sensor results and produce the assessment data from the sensor results.

The method may further include the steps of, before providing the user interface: receiving first rules package data describing the first rules package, the first rules package including first descriptive information of the first rules package; associating the first rules package with a vendor account associated with a provider of the first rules package to the computing environment; and, creating the user interface to include a first display selectable as the user input, the first display including the first descriptive information and second descriptive information identifying the provider of the first rules package. The method may further include the step of, in response to receiving the user input, updating a rules package registry to include information indicating that the first rules package is associated with the user account, the rules package registry associating the first rules package with the vendor account. The method may further include the steps of: obtaining, from a rules package registry comprising a first record associating the vendor account with the first rules package, user feedback information describing a reputation score of the provider; and including the reputation score in the second descriptive information.

Receiving the user input may include receiving a selection of the first security assessment, the method further comprising associating the first security assessment with the user account to enable the user to configure the instance of the first security assessment. Providing the user interface may include identifying the first rules package and a second rules package that identifies the security vulnerabilities by operating on the sensor results, and including the first rules package and the second rules package in the list of available rules packages.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification is not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. A system, comprising:
   an electronic data store storing data describing a plurality of security assessments, each security assessment associated with a rules package including a plurality of rules used to evaluate assessment data to produce findings associated with security vulnerabilities; and
   one or more hardware computing devices in communication with the electronic data store and configured to execute specific computer-executable instructions that upon execution cause the system to:
   providing, to a user computing device in communication with the one or more hardware computing devices, an interface representing an electronic marketplace within which any of the plurality of security assessments are selectable;

receive, from the user computing device in communication with the one or more hardware computing devices, a request to select a first security assessment from the plurality of security assessments via the interface, the first security assessment associated with a first rules package and with a first sensor that produces sensor results describing an associated virtual machine instance;

in response to the request, cause the first rules package to be associated with a user account associated with the user computing device; and in response to a request to perform a security assessment using the first security assessment on a virtual machine associated with the user account:

configure an instance of the first sensor to generate first sensor results for the virtual machine, the plurality of sensors including the first sensor and the sensor results including the first sensor results; and cause a scanning service to convert the first sensor results into first assessment data and determine, based at least in part on the first rules package evaluating the first assessment data, an assessment finding for the virtual machine, wherein the first rules package is prevented from directly evaluating sensor results of a plurality of sensors associated with a computing resource service provider, the plurality of sensors including the first sensor and the sensor results including the first sensor results.

2. The system of claim 1, wherein:

the electronic data store further stores a security assessment configuration associated with the first security assessment; and executing the specific computer-executable instructions further causes the one or more hardware computing devices to:

further in response to the selection of the first security assessment, create a security assessment record associated with the user account and containing the security assessment configuration;

configure the first sensor based at least in part on the security assessment configuration; and associate the assessment finding with the user account using the security assessment configuration.

3. The system of claim 1, wherein the electronic data store associates the first security assessment with the first rules package data in a first security assessment record, and further stores a second security assessment record associating a second security assessment, of the plurality of security assessments, with a second rules package that is enabled to directly evaluate the sensor results of the plurality of sensors.

4. A system, comprising one or more hardware computing devices configured to execute specific computer-executable instructions that upon execution cause the system to:

providing to a user computing device a user interface that enables a user of the user computing device to select any of a plurality of available rules packages available via an electronic marketplace;

receive, from the user computing device, user input comprising a selection of a first security assessment from the plurality of security assessments selectable via the electronic marketplace, the first security assessment invoking a first rules package comprising a plurality of first rules that operate on assessment data to evaluate a first set of the one or more security characteristics; and cause the first rules package to be associated with the user account;

receive a request associated with the user account to cause an instance of a first sensor to produce first sensor results describing a computing resource associated with the user; and receive a request associated with the user account to cause an instance of the first security assessment to be performed on the computing resource, wherein the instance of the first security assessment causes a security assessment system to receive the first sensor results and to produce the assessment data from the first sensor results, wherein the first rules package is prevented from accessing the first sensor results.

5. The system of claim 4, wherein the first sensor results comprise a plurality of data elements, the assessment data has a first format on which the plurality of rules are configured to operate, and the first format excludes one or more of the plurality of data elements from the assessment data.

6. The system of claim 4, wherein the assessment data comprises one or more data elements copied from the first sensor results, and the plurality of rules of the first rules package are configured to access the assessment data to obtain the one or more data elements.

7. The system of claim 4, wherein executing the specific computer-executable instructions further causes the system to, in response to receiving the user input, cause a security assessment configuration of the first security assessment to be associated with the user account, wherein association of the security assessment configuration of the first security assessment with the user account enables the user to configure, by editing the security assessment configuration, the instance of the first security assessment.

8. The system of claim 4, wherein executing the specific computer-executable instructions further causes the system to:

receive first rules package data describing the first rules package; and associate the first rules package with a vendor account associated with a provider of the first rules package to the system.

9. The system of claim 8, wherein executing the specific computer-executable instructions further causes the system to:

receive a first security assessment configuration associated with the first security assessment;

associate the first security assessment configuration with the vendor account; and in response to receiving the user input, cause the first security assessment configuration to be associated with the user account, wherein association of the first security assessment configuration with the user account enables the user to configure the instance of the first security assessment of the computing resource.

10. The system of claim 8, wherein executing the specific computer-executable instructions further causes the system to, in response to receiving the user input, cause a rules package registry to be updated to include information indicating that the first rules package is associated with the user account, the rules package registry associating the first rules package with the vendor account.

11. The system of claim 8, wherein executing the specific computer-executable instructions further causes the system to:

obtain, from a rules package registry comprising a first record associating the vendor account with the first rules package, user feedback information describing a reputation score of the provider.

12. The system of claim 4, wherein executing the specific computer-executable instructions further causes the system to:
- receive first rules package data describing the first rules package and including a visibility indicator having a first value that indicates the first rules package can be made available in an electronic marketplace;
- receive second rules package data describing a second rules package created by a second user;
- determine that the second rules package data includes the visibility indicator having a second value that indicates the second rules package cannot be made available in the electronic marketplace; and
- exclude from the plurality of security assessments any private security assessment that uses the second rules package.

13. The system of claim 4, wherein instances of the plurality of security assessments operate within a computing environment of a computing resource service provider, the first security assessment is created by an author other than the computing resource service provider, and a second security assessment of the plurality of security assessments is created by the computing resource service provider.

14. A method, comprising:
- receiving, from a requesting device, a request to provision a security assessment within a computing environment of a computing resource service provider, wherein the security assessment:
  - causes one or more sensors of the computing environment to produce sensor results describing activity of a target computing resource within the computing environment; and
  - invokes one or more rules packages comprising a plurality of rules that identify security vulnerabilities of the target computing resource;
- providing to the requesting device a user interface that enables a user of the user computing device to select any of a plurality of available rules packages;
- receiving, via the user interface, user input comprising a selection of a first rules package comprising a plurality of first rules that operate on assessment data to identify the security vulnerabilities, wherein the first rules package cannot operate on the sensor results; and
- associating the first rules package with a user account to enable a user associated with the user account to launch an instance of a first security assessment on a computing resource associated with the user, the first security assessment invoking the first rules package and causing a security assessment system of the computing environment to receive the sensor results and produce the assessment data from the sensor results.

15. The method of claim 14, further comprising, before providing the user interface:
- receiving first rules package data describing the first rules package, the first rules package including first descriptive information of the first rules package;
- associating the first rules package with a vendor account associated with a provider of the first rules package to the computing environment; and
- creating the user interface to include a first display selectable as the user input, the first display including the first descriptive information and second descriptive information identifying the provider of the first rules package.

16. The method of claim 15, further comprising, in response to receiving the user input, updating a rules package registry to include information indicating that the first rules package is associated with the user account, the rules package registry associating the first rules package with the vendor account.

17. The method of claim 15, further comprising:
- obtaining, from a rules package registry comprising a first record associating the vendor account with the first rules package, user feedback information describing a reputation score of the provider; and
- including the reputation score in the second descriptive information.

18. The method of claim 14, wherein receiving the user input comprises receiving a selection of the first security assessment, the method further comprising associating the first security assessment with the user account to enable the user to configure the instance of the first security assessment.

19. The method of claim 14, wherein providing the user interface comprises identifying the first rules package and a second rules package that identifies the security vulnerabilities by operating on the sensor results, and including the first rules package and the second rules package in the list of available rules packages.

* * * * *